INVENTORS:
Myron J. Mendelson
Alfred Doig, Jr.
Robert C. Douthitt
By
their Attorneys INVENTORS:
Myron J. Mendelson
Alfred Doig, Jr.
Robert C. Douthitt
By Kearl Bernst
Louis A Kline
John J. Matlago
their Attorneys

COMPUTER SORTING SYSTEM

INVENTORS:
Myron J. Mendelson
Alfred Doig, Jr.
Robert C. Douthitt
By Carl Beust
Louis A. Kline
John J. Matlago
their Attorneys July 25, 1961 M. J. MENDELSON ET AL 2,994,066

COMPUTER SORTING SYSTEM

Filed Nov. 26, 1956 13 Sheets-Sheet 4

INVENTORS:
Myron J. Mendelson
Alfred Doig, Jr.
Robert C. Douthitt
By Louis A Kline
John J. Matlago
their Attorneys

COMPUTER SORTING SYSTEM

Filed Nov. 26, 1956 13 Sheets-Sheet 5

INVENTORS:
Myron J. Mendelson
Alfred Doig, Jr.
Robert C. Douthitt
By [signatures]
their Attorneys

COMPUTER SORTING SYSTEM

INVENTORS:
Myron J. Mendelson
Alfred Doig, Jr.
Robert C. Douthitt

Earl Beust
Louis A Kline
By John T. Matlago, Agent
Their Attorneys

INVENTORS:
Myron J. Mendelson
Alfred Doig, Jr.
Robert C. Douthitt
By Earl Bennett
Louis A Kline
John J. Matlago
their Attorneys Fig. 14
ENTRY LENGTH CODE
| | $O_1$ | | | $O_0$ | | |
|---|---|---|---|---|---|---|
| | $P_2$ | $P_1$ | $P_0$ | $P_2$ | $P_1$ | $P_0$ |
| For 1-word entry | 0 | 0 | 0 | 0 | 0 | 0 |
| For 2-word entry | 0 | 0 | 0 | 0 | 0 | 1 |
| For 4-word entry | 0 | 0 | 0 | 0 | 1 | 1 |
| For 8-word entry | 0 | 0 | 0 | 1 | 1 | 1 |
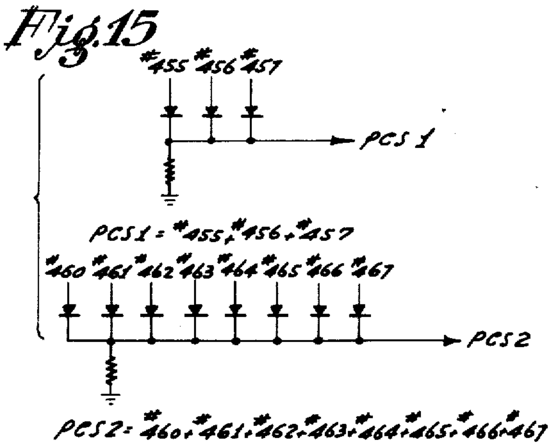
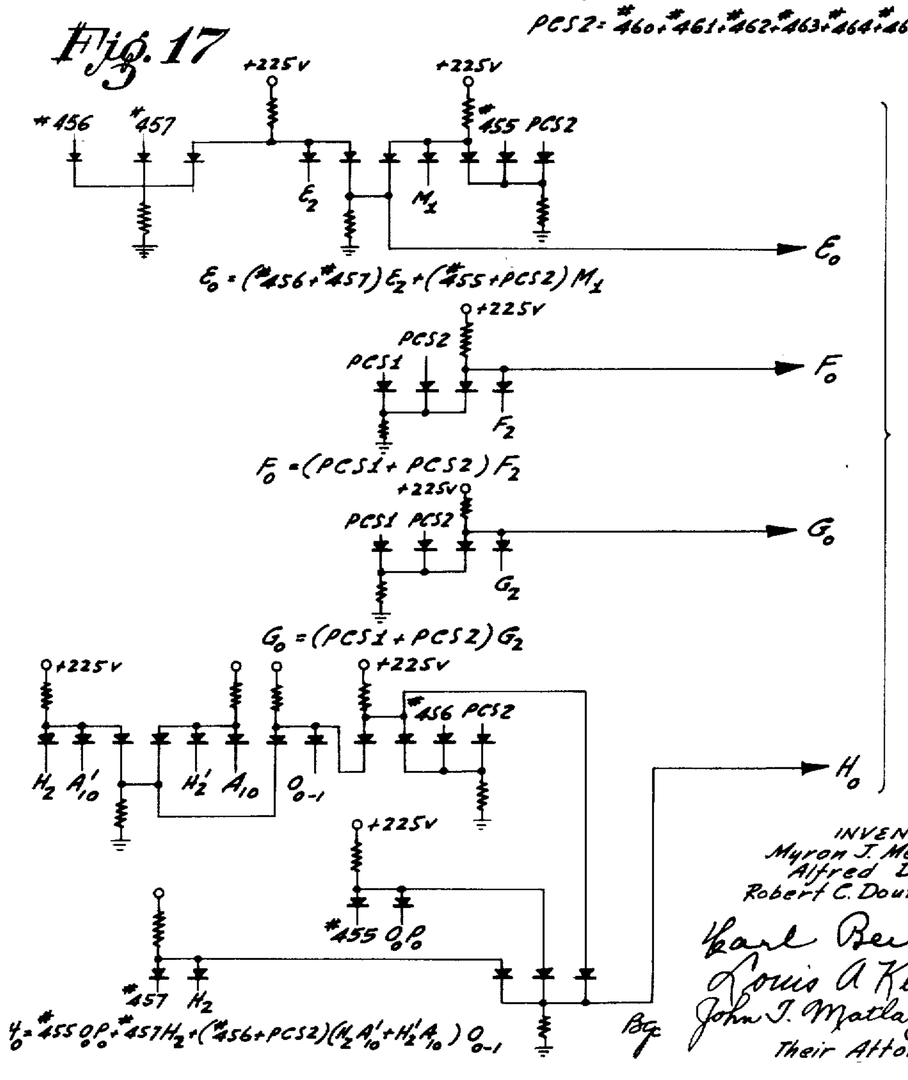
INVENTORS:
Myron J. Mendelson
Alfred Doig, Jr.
Robert C. Douthitt
By Karl Beust
Louis A Kline
John T. Matlago, Agent
Their Attorneys

COMPUTER SORTING SYSTEM

Filed Nov. 26, 1956 13 Sheets-Sheet 9

INVENTORS:
Myron J. Mendelson
Alfred Doig, Jr.
Robert C. Douthitt

Earl Beust
Louis A Kline
By John J. Matlago, Agent
Their Attorneys

INVENTORS:
Myron J. Mendelson
Alfred Doig, Jr.
Robert C. Douthitt
By Earl Beust
Louis A Kline
John J. Matlago
their Attorneys INVENTORS:
Myron J. Mendelson
Alfred Doig, Jr.
Robert C. Douthitt By Carl Beust
Louis A. Kline
John T. Matlago, Agent
Their Attorneys INVENTORS:
Myron J. Mendelson
Alfred Doig, Jr.
Robert C. Douthitt By Earl Bennett
Louis A. Kline
John J. Matlago, Agent
Their Attorneys $$a_9 = \#456[E_2 M_1' F_2 O_{0-13} (O_{13} P_2)' + A_8' O_{13} P_2]\ C$$

$$_oa_9 = \{\#456[E_2' M_1 F_2 O_{0-13} (O_{13} P_2)' + A_8 O_{13} P_2] + \#457\ M_5 O_0 P_0 + PCS2\ A_8 K_1\} C$$

INVENTORS:
Myron J. Mendelson
Alfred Doig, Jr.
Robert C. Douthitt
By Earl Bennett
Louis A. Kline
John T. Matlago
their Attorneys

United States Patent Office 2,994,066

Patented July 25, 1961

2,994,066

COMPUTER SORTING SYSTEM

Myron J. Mendelson, Los Angeles, Alfred Doig, Jr., Culver City, and Robert S. Douthitt, El Cerrito, Calif., assignors to The National Cash Register Company, Dayton, Ohio, a corporation of Maryland Filed Nov. 26, 1956, Ser. No. 624,468
18 Claims. (Cl. 340—172.5)

This invention relates to means for sorting entries in the cyclical memory of a digital computer and more particularly to means integral with the computer to determine the relative magnitude of such entries and to provide indicia corresponding therewith.

This application is a continuation-in-part of the application "Computer Sorting System" of Mendelson et al., Serial No. 487,172, filed January 27, 1955.

In accounting operations, groups of items of information, each item comprising data referring to a specific business transaction, are often required to be sorted in accordance with one datum in the items. Where a digital computer is employed to handle the items, they are programmed as "entries" into the memory of the computer in successive storage registers in accordance with the sequence in which they are received. It has heretofore been known that entries of this type could be sorted by means of equipment external to the computer. Such equipment requires that the entries be read out of the computer and encoded, for example, on a tape to be used as a basis for the sorting operation. The tape is inserted into the sorting equipment which, through its operation, produces another tape with the entries reproduced in sorted sequence. Quite often this system requires considerable production and processing of intermediate tapes involving time and expense and is subject to personnel error.

Accordingly the present invention eliminates the need for sorting equipment external to the computer by providing a sorting system which is an integral part of the computer. Broadly, this system comprises means to determine the magnitude of the datum in an entry relative to the same datum of other entries in the computer memory, means to assign a numerical designation (tag) to correspond with the relative magnitude, and means to insert this tag in a position of the computer memory to correspond timewise with the position of the entry.

As is customary in programming a digital computer, the unsorted entries are each made to occupy the same number of succesive storage registers of a memory channel, that is, an "entry" is herein defined as representing a serial array of binary coded information occupying one or a plurality of storage registers. Since a storage register can store a "word," an entry can comprise one or a plurality of binary-coded computer words. Briefly, in the present invention, the word with the sorting datum (sort control word), which comprises a part of the first entry in the channel, is set up to be used as a standard by the computer arithmetic unit. This is done by setting up the binary digits stored by a first one-word recirculating register of the computer to correspond to those of this sort control word. As subsequent words of the memeory channel pass through the arithmetic unit, an arrangement of networks therein compares the digits of this recirculating register (the standard sort control word) with these subsequent words of the memory channel. These comparisons are made only for those digit positions of the words which are occupied by the sorting datum, as indicated by programmed binary digit ones in these digit positions of a second one-word recirculating register. A flip-flop circuit is set to indicate the results of this comparison. A counter is arranged to increase its content in multiples of units corresponding to the entry length (measured in computer words) each time the magnitude of the number represented by the sorting digits of the standard sort control word exceeds that of the number represented by the sorting digits of a word containing a sorting datum. When all the words of the channel have passed through the arithmetic unit, i.e., have been so compared, the output of a logical adder energized by the counter, which output represents the relative magnitude of the number represented by the datum of the standard sort control word and is the numerical designation (tag) heretofore mentioned, is transferred to another memory channel, designated as the sort address channel. This transfer is made to registers of the sort address channel, the arc addresses of which are the same as those for the words of the entry containing the standard sort control word such that succeeding registers of the sort address channel differ by one unit. Succeeding words with a sorting datum, in order, are similarly handled with the exception that the content of the counter is also increased (as before, in units of entry length) if the magnitude of the number represented by the sorting digits of the standard sort control word presently in the first recirculating register exceeds or is equal to the number represented by the sorting digits of the other words with a sorting datum that have already been sorted, or in other words, after the last word of the channel has passed through the arithmetic unit. When all sort control words have been thus tagged, the sorting process is automatically halted.

It may be noted that an object that this process achieves is the elimination of intermediate steps external to the computer otherwise required for sorting.

A second object of this invention is to minimize time, effort, and chance of error in effectuating the sorting of a considerable number of entries.

Another object of the invention is to provide a computer sorting system which does not affect the relative position of entries in the computer memory.

Still another object of the invention is the provision of numerical designations corresponding to the relative magnitude of specified digits of words in a computer memory and the assignment of a separate memory location to such designations, enabling independent reference to the words in accordance with the numerical designations. Closely related to this object is the provision for multiple sorts of the same words in the memory whereby each sort results in a separate set of numerical designations and each set of designations may be stored separately in the memeory.

Yet another object of the invention is the provision of a counter operable in a plurality of preselected modes, one mode corresponding to each of a plurality of entry lengths capable of being handled by the computer.

A further object of this invention is to provide a system internal in a digital computer to accomplish a sorting operation in accordance with the basic principles of logical design upon which other operations of the computer are based.

Other objects and many of the attendant advantages of this invention will become readily appreciated as the same becomes better understood by reference to the preferred embodiment described in the following description and the accompanying drawings wherein.

Figures 2, 3, 4, 4A:
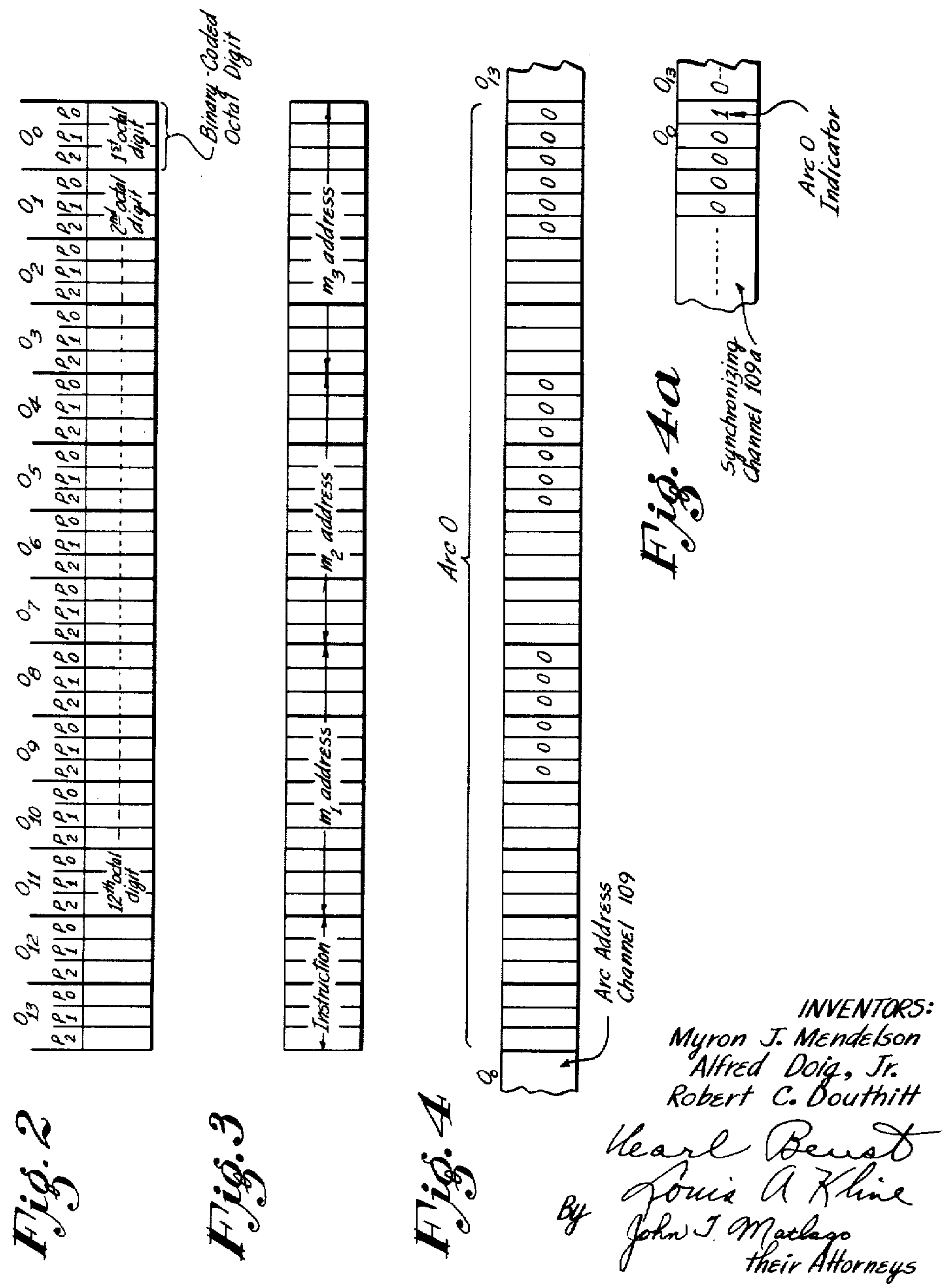
FIG. 2 shows a detail of the code pattern employed during a word period to represent a number.
FIG. 3 shows a detail of the code pattern employed during a word period to represent a command.
FIG. 4 shows a portion of the arc address channel and how the code pattern of the particular arc address 0 is recorded thereon.

FIG. 4*a* shows a portion of the synchronizing channel and how the arc 0 indicator is recorded thereon.

Figures 5, 6, 7, 8:
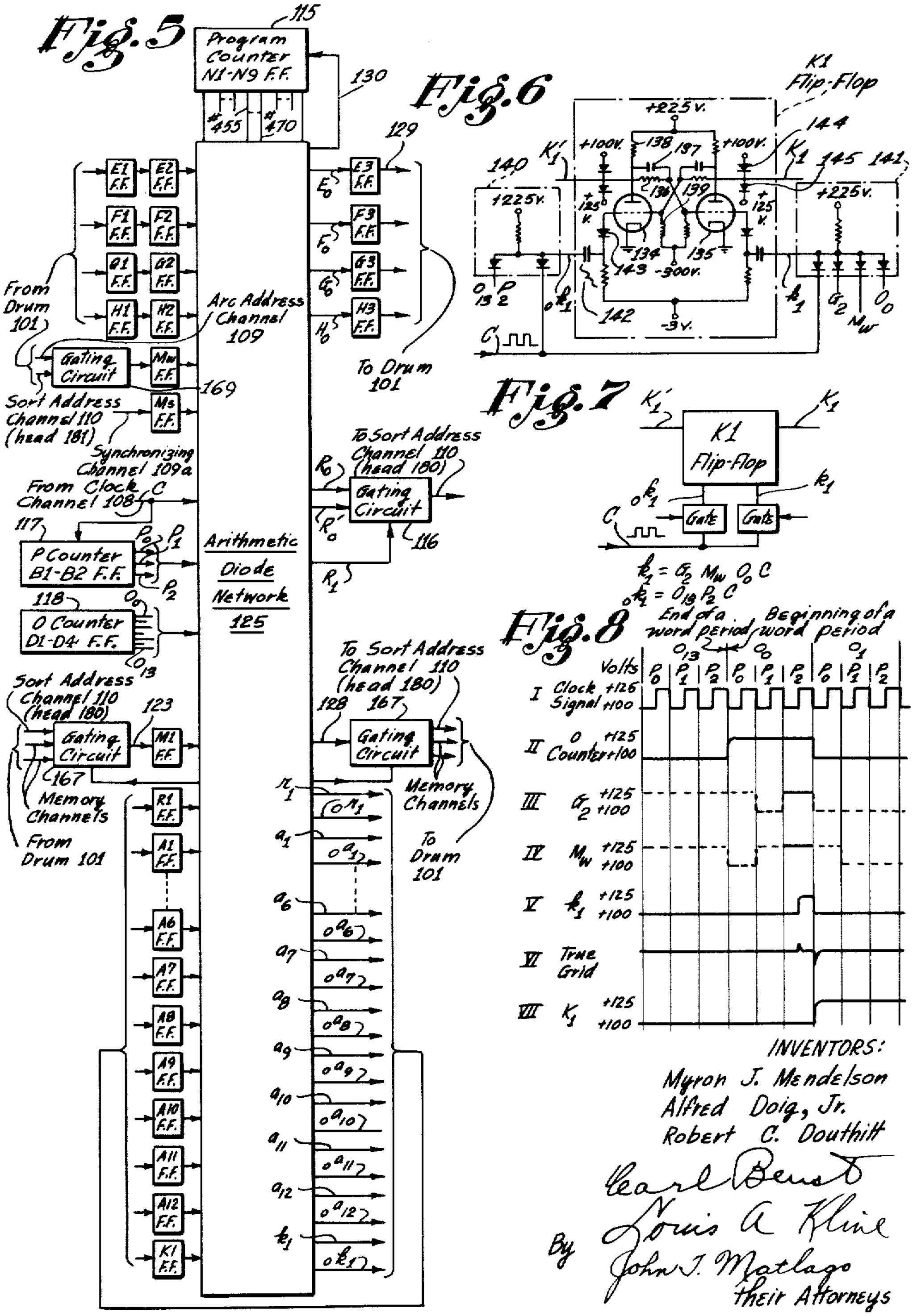

FIG. 5 is an overall diagram of the computer arithmetic unit showing relevant inputs, outputs, and storage flip-flops.

FIG. 6 is a schematic diagram of flip-flop K1.

FIG. 7 is a block diagram of flip-flop K1 together with the logical equations defining its operation during PC#457.

FIG. 8 is a graph of the waveforms concerned with the $k_1$ triggering equation during PC#457.

Figure 9:
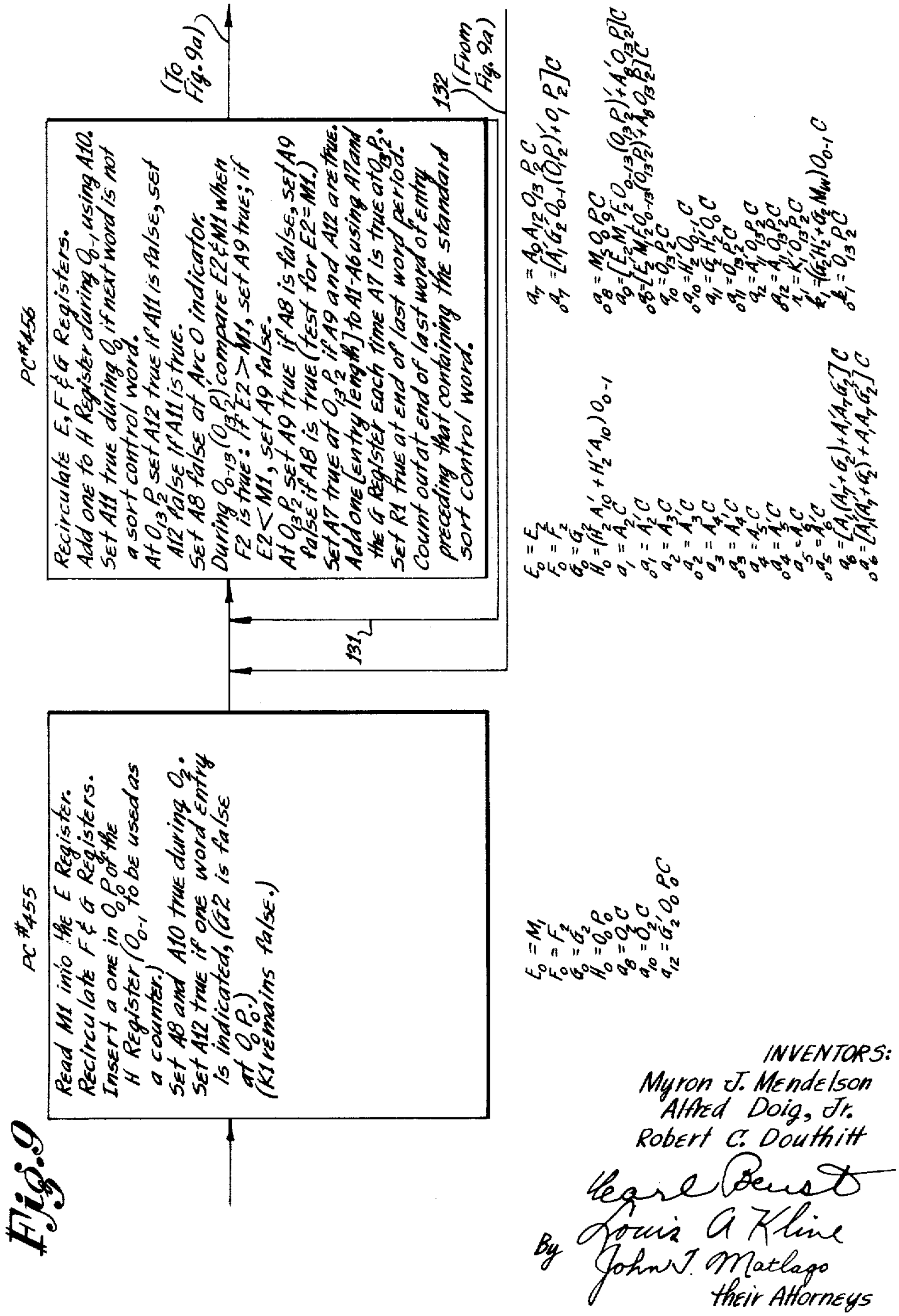
Figure 9A:
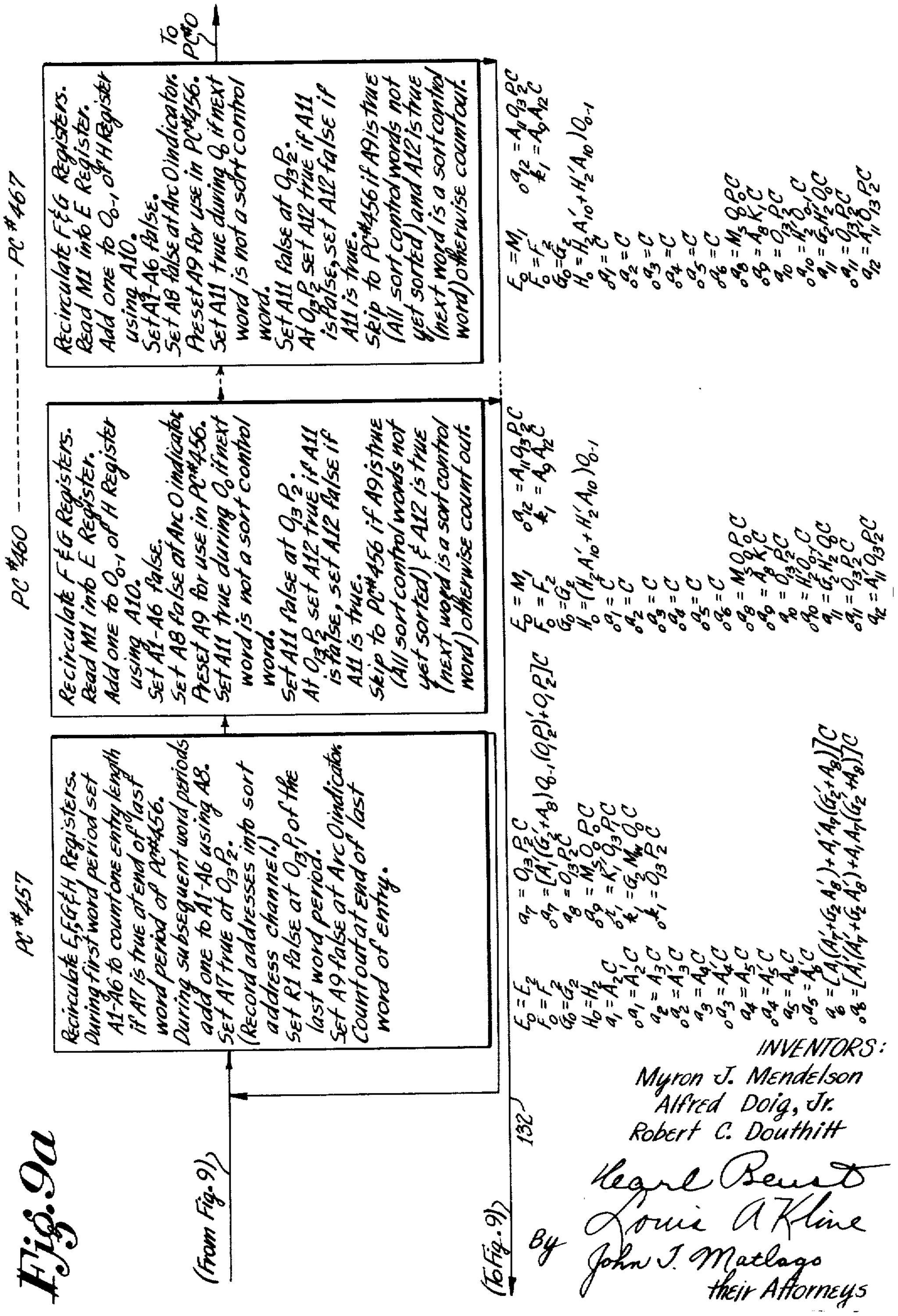

FIGS. 9 and 9*a* show the portion of the functional flow diagram of the computer which accomplishes sorting.

Figure 10:
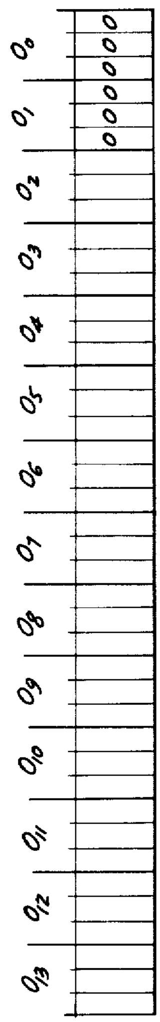

FIG. 10 shows the arrangement in the H recirculating register of a word count of 0.

Figure 11:
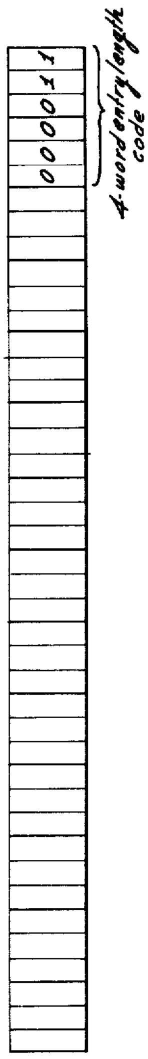

FIG. 11 shows the arrangement in the G recirculating register of the code for an entry length of four words.

Figure 12:
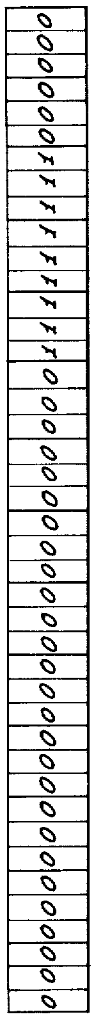

FIG. 12 shows an example of the arrangement in the F recirculating register of ones in binary positions over which sorting is to be done.

Figure 13:
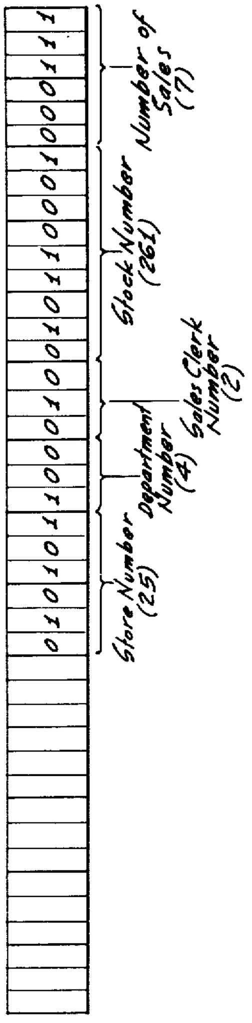

FIG. 13 shows an example of the arrangement in the E recirculating register of a sort control word.

Figure 13A:
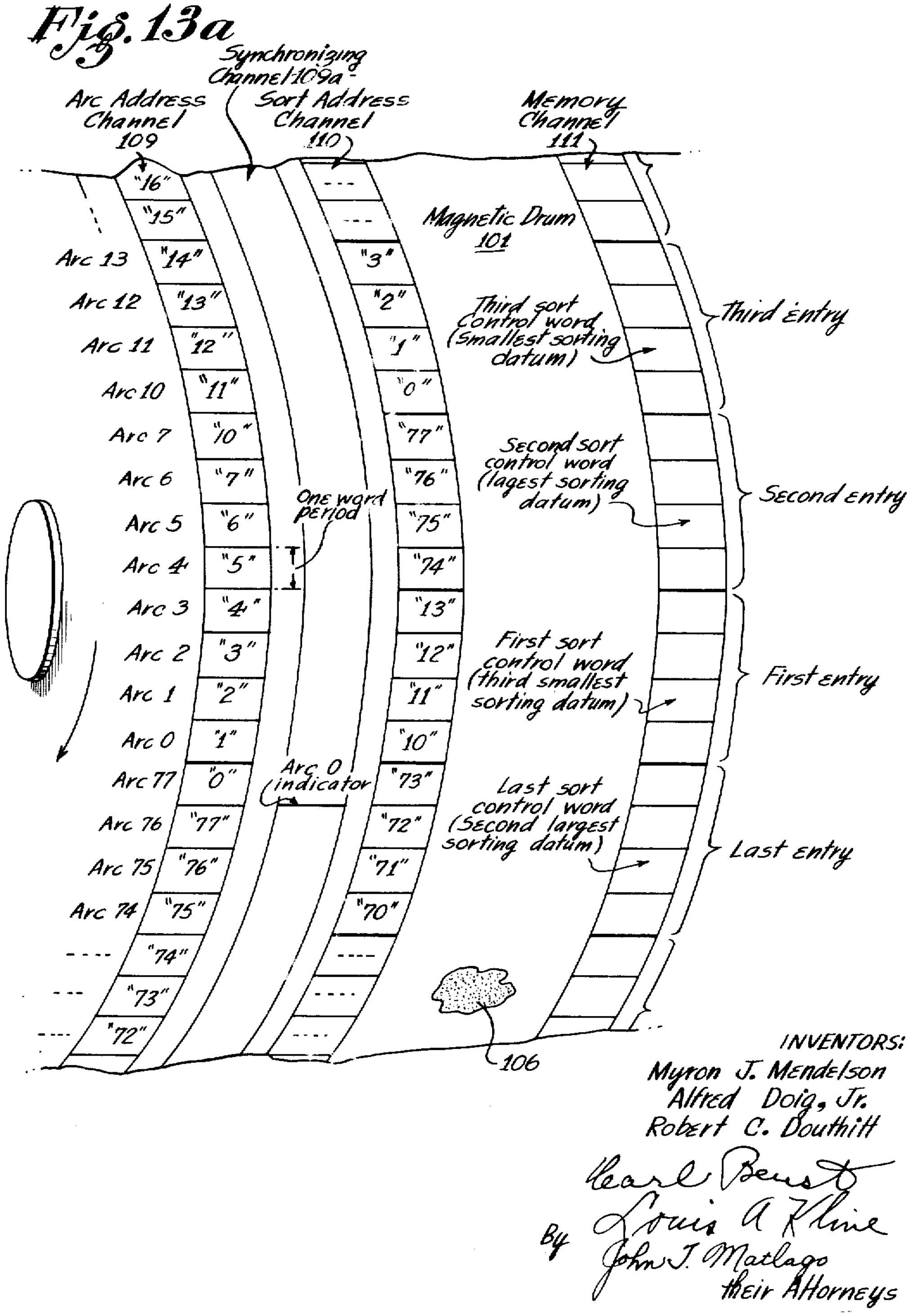

FIG. 13*a* is an illustration depicting the arrangement of information on the computer drum for a particular sorting problem.

FIG. 14 is a table showing the coding in the first two octal periods of the G recirculating register for the four entry lengths.

FIG. 15 shows the diode networks provided for generating the program counter sum logical propositions which render the required networks of the arithmetic unit effective during a word period.

Figure 16:
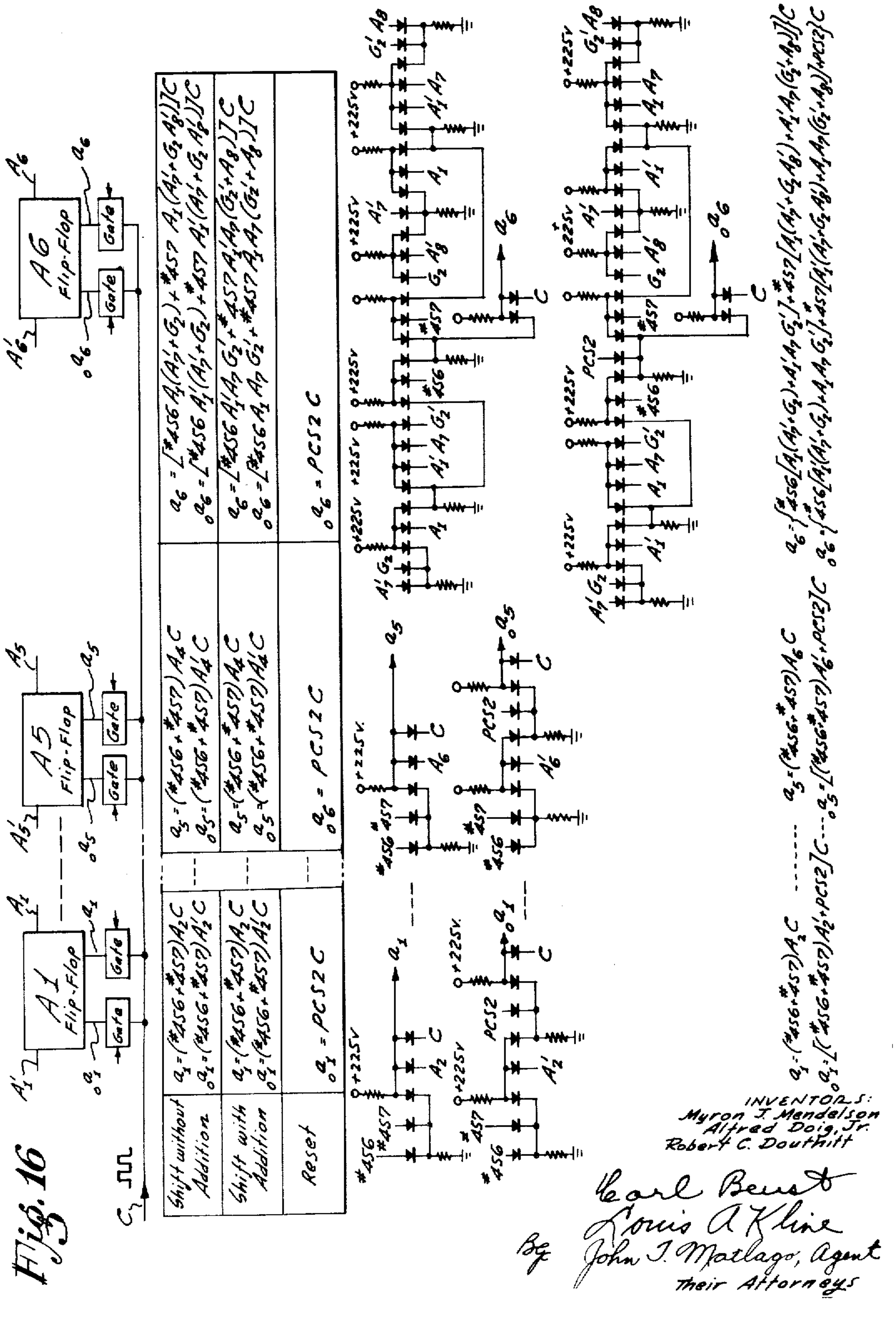

FIG. 16 shows block diagrams of counter flip-flops A1 to A6 together with their logical equations and triggering diode networks.

FIG. 17 shows the diode networks for generating the equations for propositions $E_0$, $F_0$, $G_0$, and $H_0$.

Figures 18, 19:
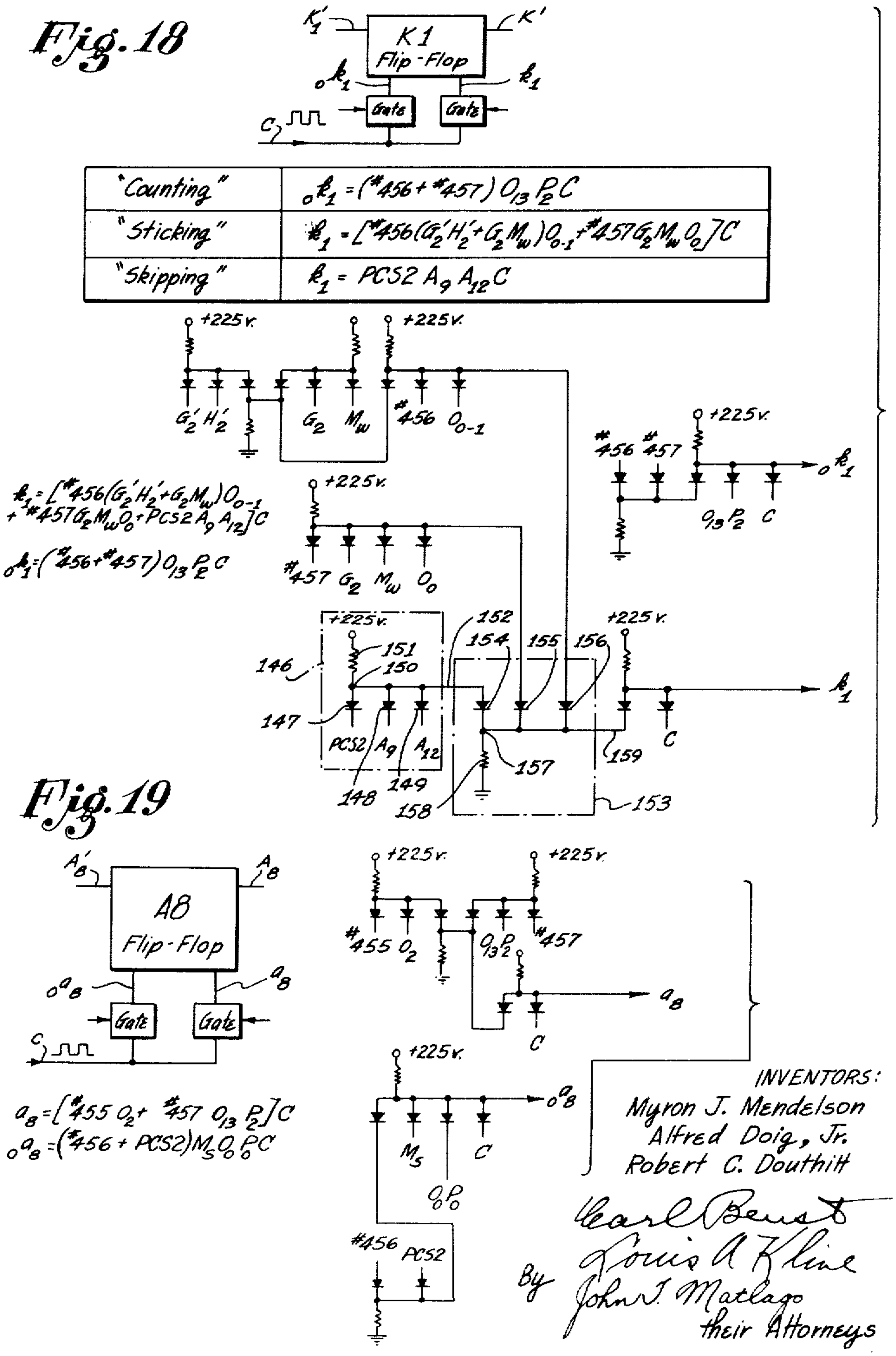
Figures 20, 21, 22:
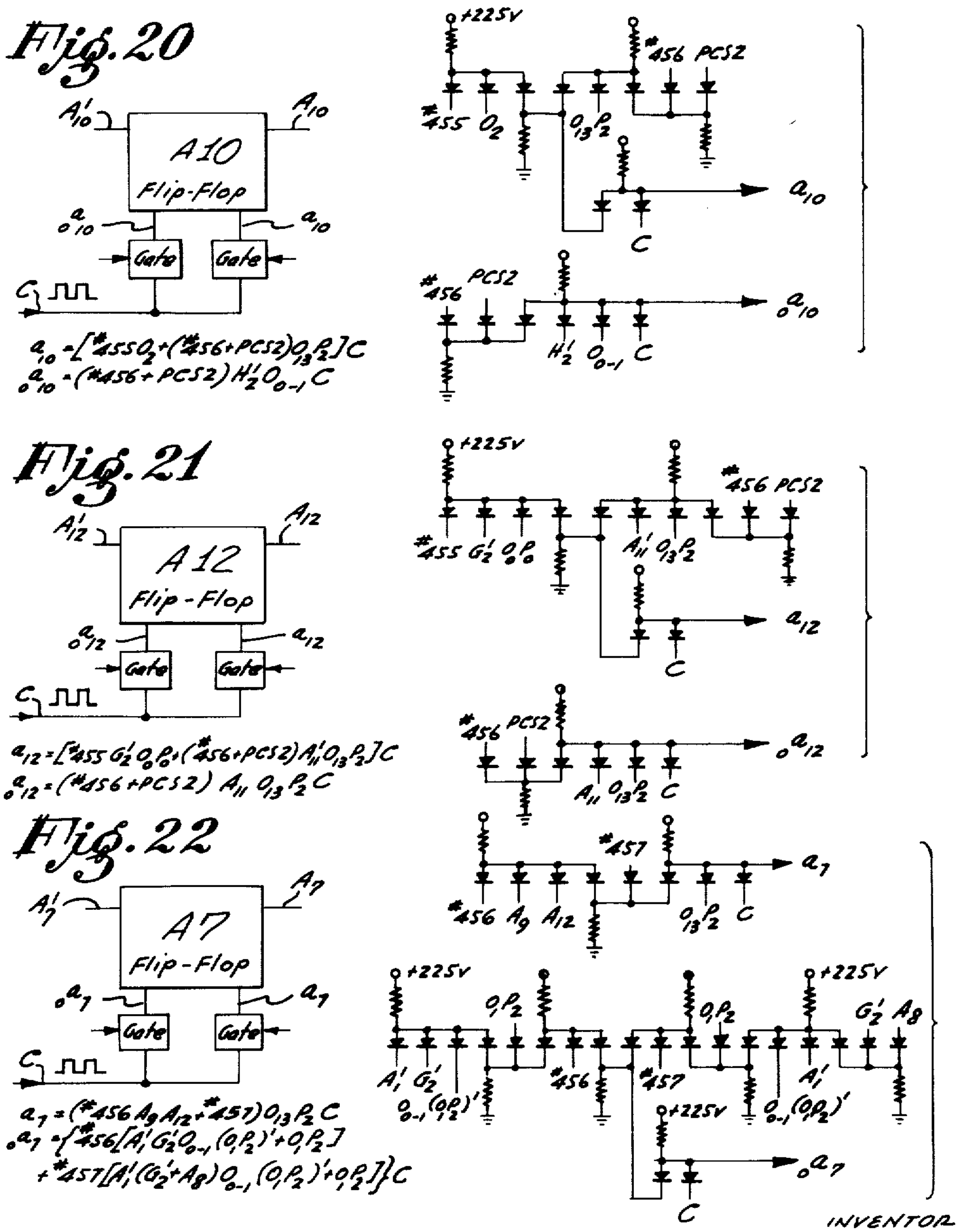
Figure 23:
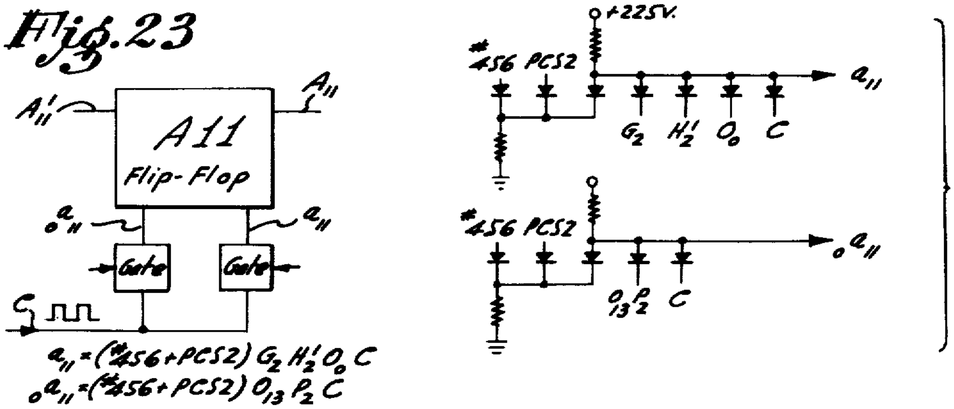
Figure 25:
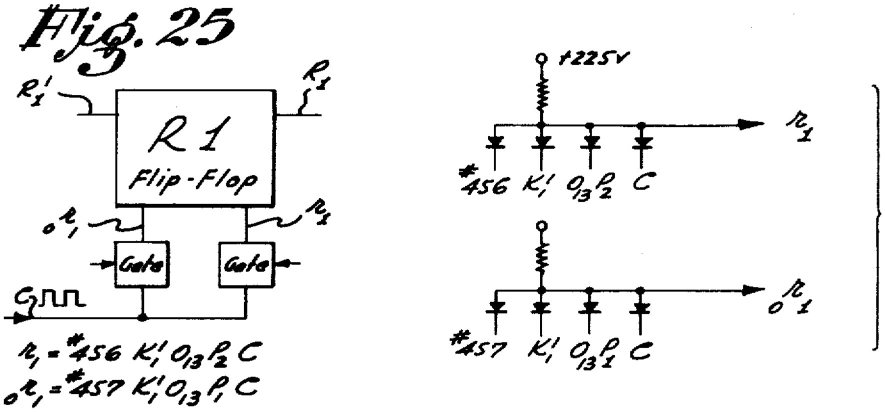

FIG. 18 shows the block diagram, the logical equations, and triggering diode networks for flip-flop K1.

FIGS. 19 to 25 show the block diagrams of flip-flops A8, A10, A12, A7, A11, A9, and R1, respectively, together with their logical equations and triggering diode networks.

Figure 26:
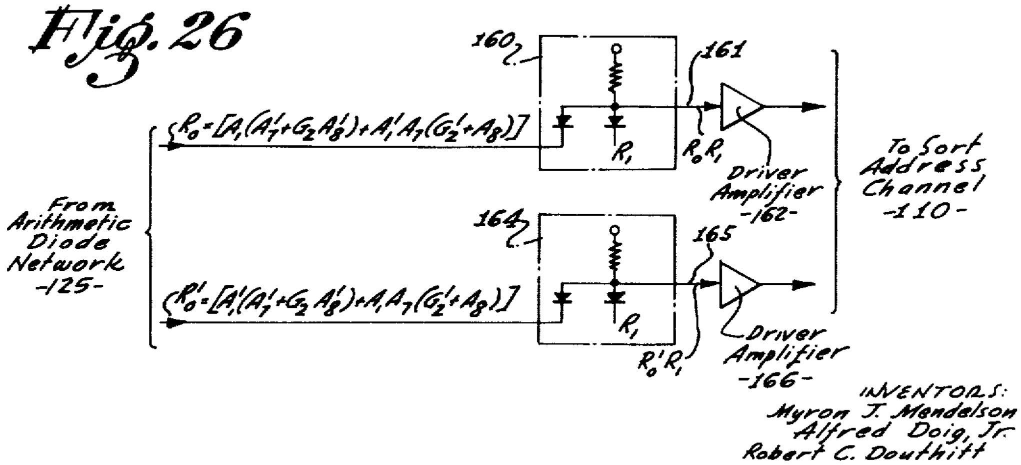
Figure 24:
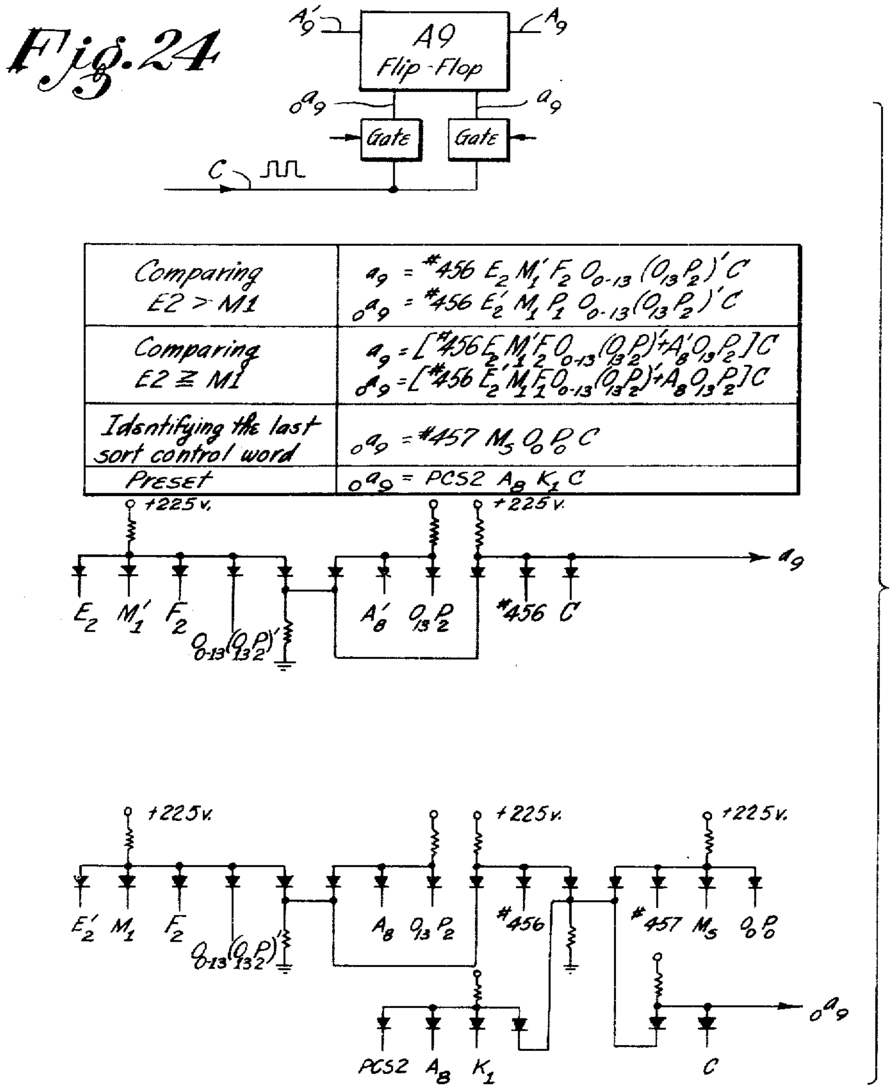

FIG. 26 is a schematic diagram of gating circuit 116.

The preferred embodiment of the present invention is herein disclosed as part of a general purpose computer. This specification and the accompanying drawings will describe and illustrate in detail only such portions of the computer as are directly concerned with the present invention and are necessary to explain the principle and operation thereof.

Figure 1:
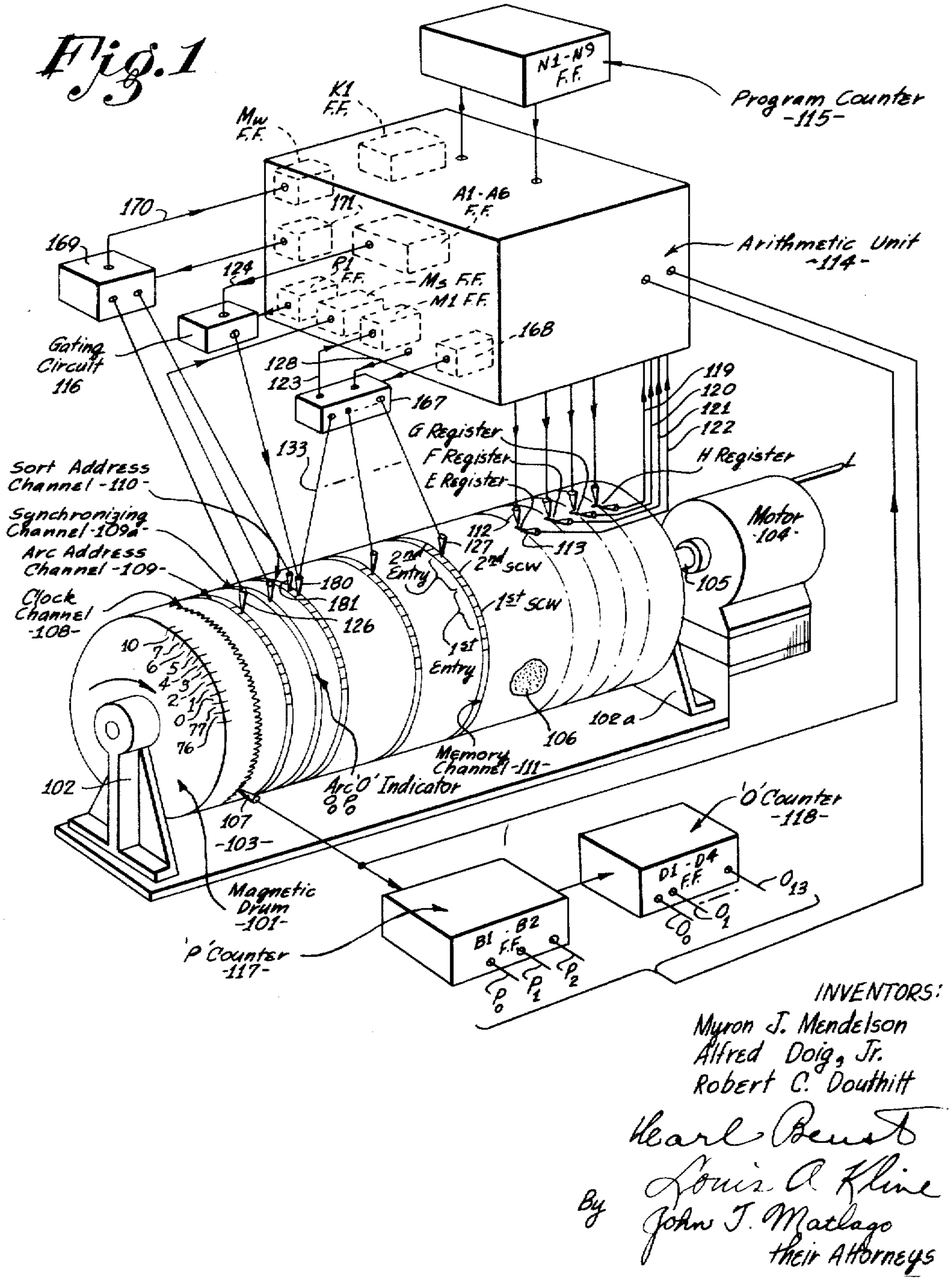
FIG. 1 is a perspective view illustrating the cooperative relationship of relevant portions of the computer system exemplifying the present invention.

Referring first to FIG. 1, a perspective view is shown of a computer incorporating the preferred embodiment of the invention.

Here is shown magnetic memory drum 101, supported on suitable arbor mounts 102 and **102*a* and a base plate 103. Drum 101 is rotated in a clockwise direction, as indicated by the arrow on its left end, by motor 104 driving through drive shaft 105. Deposited on the surface of drum 101 is a coating 106 of magnetic material, such as ferric oxide, which enables information to be stored as magnetic patterns thereon. Shown stationarily positioned to have a working relation with coating 106 are a plurality of sensing elements, such as head 107, which, as drum 101 revolves, define circumferential channels, such as clock channel 108**.

Commencing from the left end of drum 101, the first channel thus defined is designated clock channel 108, the second channel is designated arc address channel 109, and the third channel is designated synchronizing channel **109*a*. These three channels contain permanently recorded information. Next is shown sort address channel 110, which, when the sorting process is completed, contains the numerical designations (tags) indicating the relative magnitude of the sorting data in the entries which were sorted. Next on drum 101 are the memory channels, one of which is memory channel 111. The information in the memory channels is comprised of computer "words" as hereinafter described. Toward the right end of drum 101 four more channels are defined on the drum. These channels are different from the others in that only a small arc on each is storing useful information at any given time. Also, this information is stored dynamically in that the moving arc serves as a medium for temporarily delaying information recorded thereon so that it can be picked up a fixed period later. As will be subsequently described, the combination of the delay obtained by this means, together with a delay obtained by a series of flip-flop circuits in arithmetic unit 114 constitute each of the loops referred to as the E, F, G, and H recirculating registers. Each of these recirculating registers provides means for serially recirculating information through arithmetic unit 114** so that it can be operated upon.

Clock channel 108 completely circumscribes drum 101 and contains a permanently recorded magnetic flux pattern representing an electrical sine wave so as to form a closed loop. Each cycle of this sine wave defines an elementary memory area on the drum periphery on which a binary digit of information may be recorded. Thus the signals on clock channel 108 divide the drum circumference into a fixed number of such elemental areas; namely, 2688 in this computer. Clock head 107 is stationarily positioned close to the drum periphery and senses the changes in magnetic flux pattern, thereby generating an electrical signal indicative of each sine wave cycle. In construction, clock head 107 is comprised of a split core of soft iron or a like conductor of magnetic lines of force, and a coil wound thereon, in which the electrical sine wave-form is induced as the magnetic flux on drum 101 moves past the core gap. One terminal of the coil is grounded and the other terminal is connected to circuitry designed to shape the induced voltage to a symmetrical square wave-form preliminary to causing it to serve as driving voltage for other components. Such circuitry (not shown) is well known in the art and generally comprises several stages of amplification, a pulse shaping circuit, a triggering circuit of the Schmitt type and a diode clamping arrangement. The resulting square wave, hereinafter designated clock signal C, has a period equal to that of the original sine wave and an amplitude clamped between +100 v. D.C. and +125 v. D.C. The time period between trailing edges of clock signal C will be designated as a clock period, and a differentiated signal generated by the abrupt fall of the trailing edge of the square wave clock signal C is employed to trigger the logical circuitry in the computer. It may be noted that clock signal C is also used to synchronize logical networks of arithmetic unit 114. It should be understood that all logical propositions in the computer operate at the same two voltage levels as clock signal C, i.e., +100 v. D.C. and +125 v. D.C. With regard to the activation of circuitry, the former voltage level is ineffective while the latter is effective.

It is by utilizing the signals induced by clock channel 108 as a reference during reading and recording that the computer effectively divides the other circumferential channels of drum 101 into a similar number of elemental memory areas and also synchronizes the operation of all circuits so that they operate in accordance with a basic timing logic. Each of these elemental memory areas on the periphery of drum 101 in the other channels shown in FIG. 1 is capable of containing a digit of binary information, i.e., a saturated flux pattern either in one direction or the other. When the flux is in one direction in a given elemental memory area, a binary digit "one" is represented; when it is in the other direction, a binary digit "zero" is represented. Since the non-return-to-zero method of storing information on the drum is employed, the recorded flux pattern changes for successive memory areas only when the binary digits of a sequence change from 0 to 1, or vice versa.

Computer components are designed to serially handle information in blocks consisting of a fixed number of binary digits. These blocks may represent either commands or numbers and are commonly referred to as "words." A word is comprised of a sequence of 42 consecutive binary digits and thus requires 42 consecutive memory areas for storage. The portion or arc of a circumferential channel in which a word may be recorded is designated a storage register. Since clock channel 108 contains 2688 clock signals, storage space or registers for 64 words (2688/42) are provided on each of the channels. Thus the circumference of drum 101 is divided into 64 arcuate registers. As shown on the left end of drum 101 in FIG. 1, each pair of these registers is designated by one of the reference numerals 0 through 77 (the computer employs the octal numbering system for defining these arcuate registers). The arcs are numbered consecutively in a counterclockwise direction, and it should be noted that arc 77 is followed directly by arc 0 such that the defined registers extend over the entire circumference of the drum. The time required for one arc to pass a head is designated as one word period, which is defined by 42 cycles of the sine wave passing clock channel head 107.

In order to enable arithmetic unit 114 to properly respond to each of the digits in a register being sensed at any given time, counting circuits comprised of P counter 117 and O counter 118 are provided for counting the clock pulses generated by clock head 107 and its associated circuitry. These counters, together, respond to a cycle of 42 clock pulses. Thus the overall counting cycle defines the period allotted to a register on the drum. P counter 117 responds directly to the signals induced in the clock head 107 and has a capacity of three clock pulse counts; namely, $P_0$, $P_1$, and $P_2$. A carry pulse generated once each cycle of P counter 117 causes O counter 118 to manifest a new count. Since the unit to which O counter 118 responds is represented by a period of three clock pulses, it can be thought of as counting or defining octal digits. It is well known in the computer art that a group of three binary digits together can be readily converted into their octal equivalent. This arrangement of counters divides each register into 14 octal digits; namely, $O_0$, $O_1$ . . . $O_{13}$, as manifested by signal outputs from O counter 118. Accordingly, by noting the counts in the P and O counters together, succeeding elemental memory areas of the arc, hereinafter to be designated "binary digit positions" or "pulse positions," are identified by the P and O counters as $O_0P_0$, $O_0P_1$, $O_0P_2$, $O_1P_0$ . . . $O_{13}P_2$. In summary, each word period is divided by this arrangement into fourteen O (octal) periods each of which is subdivided into three P (binary) positions and in each of the latter may be stored one binary digit of a binary-coded octal digit. Accordingly, by noting the counts of the P and O counters, the pulse position in an arc, or storage register, presently being scanned by the heads on drum 101 can be observed.

The means employed in the P and O counters to define any pulse position or combination of pulse positions of a word, so that circuitry in arithmetic unit 114 may be arranged to provide proper triggering for flip-flops as required by their respective equations, is well understood in the prior art. Thus, considering P counter 117, FIG. 1 indicates that two flip-flops, B1 and B2, are employed. The arrangement is a parallel one in that clock signal C is simultaneously applied to all gates associated with the inputs to these flip-flops. The interconnection of the outputs, however, allow themselves to be triggered by successive clock pulses only to change their states to indicate the P cyclical counts. It is well known that there are four possible different arrangements of two flip-flops and here each of the counts $P_0$, $P_1$, and $P_2$ represents a different configuration of flip-flops B1 and B2. The arrangement for O counter 118 is similar, and each of the counts $O_0$, $O_1$ . . . $O_{13}$ represents a different configuration of flip-flops D1 through D4. Depending upon the binary digit position of an arc to be represented, a particular configuration of each of the two groups B1—B2 and D1—D4 is routed to arithmetic unit 114 during each clock period, effectuating a different arrangement in a matrix type of diode network, the effective output of which is used as an input to logical gates or mixers.

The configuration of computer words and the representation of numerals employed by the computer will next be discussed as preliminary to a description of the other channels of drum 101.

Referring to FIG. 2, a diagram showing the serial arrangement in a word period of information representing a number will be described. The word period of 42 clock periods is shown to be divided into 14 equal octal digit periods. Starting from the right, these periods are marked $O_0$ through $O_{13}$, respectively. Each of these octal periods is further divided into three binary digit positions marked $P_0$, $P_1$, and $P_2$. The present computer provides for operating on binary numbers 36 digits in length. Thus in the diagram the first binary digit position, defined by $O_0P_0$, represents the least significant binary digit of the number, and the $O_{11}P_2$ position represents the most significant binary digit. The $O_{12}$ and $O_{13}$ periods of this word contain coded information not relevant to the present invention.

In FIG. 3, the arrangement is shown for information in in a word period representing a command. It should be noted that the word diagram here shown is divided into periods defined by the O and P counts, similarly to that in FIG. 2. The information in a command is generally defined by the notation (I, $m_1$, $m_2$, $m_3$) where $m_1$, $m_2$, and $m_3$ represent addresses (arc and channel) on the memory drum, and I corresponds to an instruction to be carried out by the arithmetic unit 114. Thus in the diagram a command is shown to be divided into four sections. Starting from the right, the $m_3$ information is positioned in the periods defined by the octal counts $O_0$, $O_1$, $O_2$, and $O_3$; the $m_2$ information is positioned in the next four octal digit periods $O_4$ through $O_7$; and the $m_1$ information in the following four octal digit periods $O_8$ through $O_{11}$. The last two octal digit periods $O_{12}$ and $O_{13}$ are reserved for information corresponding to the instruction.

Referring next to FIG. 4, a diagram of a portion of arc address channel 109 (FIG. 1), defining in particular arc 0, is shown. In periods $O_{0-1}$, $O_{4-5}$, and $O_{8-9}$ (as noted in FIG. 2) of each of the arcs in arc address channel 109, signals corresponding to the binary number indication of the address of the next arc to pass head 127 of memory channel 111 are permanently recorded.

The next channel shown on drum 101 (FIG. 1) is synchronizing channel 109a. It may be noted from FIG. 4a that a single permanently recorded signal (binary digit one) is provided in position $O_0P_0$ of arc 77 of synchronizing channel 109a. As will be shown, this signal is used during the sorting process to identify the end of memory channel 111 and set various flip-flops accordingly.

As will be detailed later, the binary digits read from arc address channel 109 (or sort address channel 110) are serially set up in flip-flop $M_w$ (FIG. 5). It should be noted that the details of the circuitry for serially triggering flip-flop $M_w$, in accordance with the magnetic pattern on arc address channel 109, has already been disclosed to the art. Briefly, the binary square wave pattern impressed in arc address channel 109 (FIG. 1) is sensed by head 126 and, due to differentiation thereby, presents pulses representing the leading and trailing edges of the square wave. These pulses are amplified, clipped, clamped between the limits +100 v. D.C. and +125 v. D.C., and applied to the grid input circuits of flip-flop $M_w$ through a diode gate such that the leading-edge pulse triggers flip-flop $M_w$ into one state and the trailing-edge pulse triggers flip-flop $M_w$ into the opposite state. The grid input circuit diode gates of flip-flop $M_w$ are synchronized with the clock pulses by application of clock signal C. These concepts will be further clarified later in connection with the convention adopted to present the computer logic. The output of flip-flop Mw provides one of the inputs to diode network 125 of arithmetic unit 114, as will also be shown hereinafter. It may be noted that flip-flop Ms cooperates with synchronizing channel 109a in the same way that flip-flop Mw cooperates with arc address channel 109.

Still referring to FIG. 1, the next channel shown is sort address channel 110. As noted, during the sorting process, each sort control word, in turn, is set up as a standard, its sorting datum is compared with that of the other sort control words in the channel and tags assigned to the words of the entry containing the standard sort control word in correspondence with the relative magnitude of the datum. The arrangement of the present invention includes means to place the tags corresponding to the words of an entry in a separate channel of the memory, namely, sort address channel 110, in registers whose arc addresses (with reference to arc address channel 109) are the same as those for the registers in the memory channel containing these words. As shown, sort address channel 110 is provided with two heads, head 180 for recording the above mentioned tags, and head 181 for reading these tags as arc addresses. As shown, heads 180 and 181 are spaced one arc apart on sort address channel 110.

Next in order from the left of drum 101 are the memory channels, one of which is memory channel 111. For sorting, the information in memory channel 111 is comprised of "numbers" constructed as aforementioned, which comprise the sorting entries and on which the computer operates. Memory channel 111 is equipped with a stationary memory head 127, used for both reading and recording. Since information is always recorded into an arc of the main memory by reference to the O and P count signals, the information recorded in a register of memory channel 111 is always temporally aligned with the periods of the arcs already shown to be defined on drum 101 by arc address channel 109. As shown, information sensed by head 127 is supplied to gating circuits 167 which control the connections thereof, permitting the head of only one memory channel to communicate with arithmetic unit 114 at a time.

Still referring to FIG. 1 and to the recirculating registers E, F, G, and H more particularly, it is noted that each of these recirculating registers has two heads associated with the drum memory, one for reading and the other for recording, arranged such that, as drum 101 rotates, a portion of the drum surface will pass the record head first and the read head later. For example, the E register includes a record head 112 spaced along the drum surface from a read head 113. Thus, as far as the recirculating registers are concerned, only a small arcuate portion of the drum surface is used for storing information at a given time. This portion occupies an area equivalent to less than 42 elemental memory areas, and the information is delayed in arithmetic unit 114 a given number of clock periods so that the normal recirculating time for each of these registers is 42 clock periods, i.e., one word period. The recirculating registers have their heads interconnected by way of the arithmetic unit 114 so that, for example, when the computer circuitry is set for recirculation in the E register, a particular binary digit signal on being recorded on the drum surface by record head 112 will be carried by the revolving drum 101 to read head 113, sensed thereby, transmitted to arithmetic unit 114 wherein the signal steps through flip-flop circuits, and is then retransmitted to record head 112 by which it is again recorded. As stated, the design of the computer is such that the total time required for a particular digit to make one such cycle in each of the recirculating registers during normal recirculation is equal to one word period. This is true even if this digit undergoes a modification in arithmetic unit 114.

It should be understood that the read and record circuitry for the recirculating registers is well understood in the prior art. Briefly, as shown in FIG. 5, for the E register, for example, the output of diode network 125 of aritmetic unit 114, designated as proposition $E_0$, is a square wave clamped between +100 v. D.C. and +125 v. D.C., and is fed to the gating circuit of one grid of flip-flop E3. Proposition $E_0$ is also inverted and fed as proposition $E_0'$ to the gating circuit of the other grid of flip-flop E3. Both grid gates are synchronized with clock pulses by clock signal C as heretofore mentioned. The outputs of flip-flop E3, namely $E_3$ and $E_3'$, are represented by line 129 and are employed to energize record head 112. Nomenclature employed will be explained later.

Having described the arrangement of information in each of the word periods constituting a command, a number, arc address channel 109, sort address channel 110, and memory channel 111, it should be noted that each of the short recirculating registers E, F, G, and H, as schematically shown in FIG. 1, normally operates so as to recycle information serially contained within a single word period. Stated in another way, each of these recirculating registers normally defines a closed loop of information 42 clock periods in length. When they are each recirculating their information, the binary digits in corresponding binary digit positions of each of these registers travel in parallel around their respective loops once during each word period. It should be understood that the recirculation of information in the E, F, G, and H recirculating registers, and consequently the availability of this information to arithmetic unit 114, is independent of the communication of arithmetic unit 114 with memory channel 111 on drum 101. Furthermore, the operation of the recirculating registers is synchronized with the arcs (word registers) on drum 101. Thus it is to be noted that arithmetic unit 114 is capable of simultaneously observing corresponding digits of a maximum of five different words, the four words contained in the E, F, G, and H recirculating registers and a word being read from the memory channels, such as channel 111.

Referring back to the pictorial view of the computer system in FIG. 1, it is now apparent that arithmetic unit 114 may be simultaneously receiving corresponding digits of words from each of the E, F, G, and H registers by means of lines 119, 120, 121, and 122, respectively, and from any one of the registers of the memory channels, such as channel 111, by means of line 123.

The present computer does not provide for simultaneously reading information out of and recording information into memory channel 111. Thus, with reference to the sorting process, since information being picked up from memory channel 111 on the drum is not being recorded back onto memory channel 111, it follows that this information is being routed directly into the E recirculating register, or utilized in the arithmetic unit 114 to be operated on together with the information simultaneously being picked up from the four recirculating registers.

Next it should be broadly noted that when the arithmetic unit 114 is not set for reading information from memory channel 111, it may either be blocked off from communication with the memory or it may be switched to record information on sort address channel 110 of the memory by way of output line 124. In this latter operation, the information being recorded into a particular arc of sort address channel 110 may be a result of logically combining information being received in the arithmetic unit 114 from the recirculating registers.

While the word information in the recirculating register is serially being recirculated once each word period, the information is processed so as to advance the particular overall data processing function being carried out. The circuits which are used for processing the information during any word period are made effective by program counter 115, while the P and O counters 117 and 118, respectively, operate to let arithmetic unit 114 know which binary digit positions of a word are being sensed during a given clock period so as to know how to operate on them.

Referring now to FIG. 5 more particularly, a schematic diagram is shown of the relation of arithmetic unit 114 to other components of the computer relevant to the invention. Arithmetic unit 114 is comprised in the main of a diode network 125 which operates to interconnect the flip-flop circuits of the computer to route information and to perform digital processes on the information in accordance with specified sequences. As noted, the flip-flop circuits are the source of the binary terms which make up the logical equations by which computer operations are represented.

Flip-flops E3, F3, G3, and H3 are parts of the respective recirculating registers and respond to propositions $E_0$, $F_0$, $G_0$, and $H_0$ from diode network 125. These flip-flops serve to reconstruct and synchronize the signals derived from diode network 125 before recording them back onto drum 101.

Flip-flops E1, F1, G1, and H1 are integrally parts of of the E, F, G, and H registers, respectively, and operate such that their outputs directly follow the information read from their respective channels on drum 101.

Flip-flops E2, F2, G2, and H2 are also parts of the respective recirculating registers and serve to step information along to diode network 125.

Proposition $R_0$ is the record proposition which represents the outputs of the logical added corresponding to the content of entry counter A1—A6. Proposition $R_0'$ is its logical inverse.

Flip-flop R1, when true, serves to permit recording on sort address channel 110 by opening gating circuit 116.

Flip-flop M1 operates to feed information from the memory channels into diode network 125.

As will be subsequently described, the function of flip-flop K1 is to signal program counter 115 at the end of each word period to "count" to its next higher number, "skip" to a new number, or "stick" in the same number.

Flip-flops A1 to A6, inclusive, function as binary stages of a counter, the count in which indicates the relative magnitude of the sorting datum of the standard sort control word compared to the other sorting data in the channel.

Flip-flop A7 serves to indicate that a count is to be made in counter A1—A6, that is, that a word compared with the standard sort control word was a sort control word with sorting datum smaller than the standard if the arc 0 indicator of arc address channel 109 has not yet been sensed, or that this word was a sort control word with sorting datum smaller than or equal to the standard if the arc 0 indicator has been sensed.

Flip-flop A8 responds to the arc 0 indicator, thereby indicating that head 127 is about to sense arc 0 of memory channel 111. Previous to this time, only when the sorting datum of the standard sort control word was larger than the sorting datum of another sort control word was a count made in counter A1—A6; subsequent to this time, a count is made in counter A1—A6 also when the sorting datum of the standard sort control word is equal to the sorting datum of another sort control word.

Flip-flop A9 indicates the result of the data comparison.

Flip-flop A10 is used in the H register word counter to add a unit to this counter each word period.

Flip-flop A11 indicates whether or not the next word to pass through arithmetic unit 114 is a sort control word.

Flip-flop A12 indicates whether or not the word presently in arithmetic unit 114 is a sort control word.

It should be understood that the information picked up from, for example, the channel of the E register on drum 101 by flip-flop E1 is synchronized with clock periods. This information, on successive clock pulses, is stepped along through flip-flops E1 and E2 and is supplied to diode network 125, which, in response to this output as well as to other sources of two level potential shown feeding thereinto, generates outputs, one of which, $E_0$, is stepped into flip-flop E3 and thence back onto drum 101. After the delay, depending on the spacing of record and read heads 112 and 113, respectively, on drum 101, this information again appears in flip-flop E1. The loop thus defined represents a delay of one word period in the case of the recirculating registers.

Another output generated by diode network 125 is proposition $R_0$, representing the relative magnitude of the sorting datum of the standard sort control word recirculating in the E register, which together with its logical inverse, $R_0'$, is passed through gating circuit 116 and is recorded by head 180 in arcs of sort address channel 110. The art is well acquainted with gating and recording techniques of this nature. Briefly, as shown in FIG. 26, proposition $R_0$ from diode network 125 provides one input to diode gate 160, the other input to which is the true output of flip-flop R1, namely, $R_1$. The logical product of these two inputs, $R_0R_1$, appears on line 161 and is the input to driver-amplifier 162. The output of driver-amplifier 162 is recorded on sort address channel 110 by head 180. Generated by diode network 125 as a separate function is proposition $R_0'$, which is shown applied as one input to diode gate 164, the other input to which is also $R_1$. The logical product, $R_0'R_1$, appears on line 165 and is the input to driver-amplifier 166. The output of driver-amplifier 166 is also recorded on sort address channel 110 by head 180. The generation of propositions $R_0$ and $R_0'$, which are terms in the $a_6$ and ${}_0a_6$ triggering equations, will be further discussed in connection with FIGS. 9 and 9*a*.

It is also to be noted that sort address channel 110 may be used as a memory channel through line 133 from head 180 to gating circuit 167. Although the system is well established, it may be pointed out that selection of a memory channel is made by selector network 168. Information read from the memory channels is supplied via line 123 to flip-flop M1 of arithmetic unit 114. The operation of flip-flop M1 is similar to that for flip-flop M*w* already discussed. It should also be noted that the information on sort address channel 110 (as read out by head 181) and information from arc address channel 109 (as read out by head 126) are supplied to gating circuit 169. Selector network 171 controls gating circuit 169 to connect the output of head 126 (arc addresses) or the output of head 181 (addresses resulting from the sorting operation) via line 170 to flip-flop M*w*.

In the present computer the processes performed are all divided into sequential step or time periods of one word length. This is the time required for information in the recirculating registers to recirculate once through arithmetic unit 114. Thus, each step operation defines a fixed serial operation performed by diode network 125 in arithmetic unit 114 during a word period.

It is the function of program counter 115 to render certain networks operable during each word period so as to accomplish each of these step operations. Accordingly, each output count signal, #0, #1, etc., of program counter 115 selects, i.e., renders operable, certain circuits of diode network 125 which respond to the desired inputs during each of the 42 clock periods of a word to generate the desired output propositions.

The cycle of 42 clock periods comprising a word period is determined by the timing circuits feeding into the left of diode network 125. These circuits include the clock pulses of clock signal C, signals from 0 counter 118, and signals from P counter 117. The counter outputs operate to break up the period of a word to render certain circuits effective only during certain portions of the word. In this way, the coded information in various positions of a word can be operated upon according to its significance.

The content of program counter 115 is changed precisely at the end of each word period, as directed by the state of flip-flop K1 during the last binary digit position of each word period ($O_{13}P_2$), to cause other circuits to become operable during the next word period. Thus FIG. 5 shows that program counter 115 feeds its outputs into diode network 125 and is in turn controlled by output 130 (from flip-flop K1 controlled by diode network 125). Reference to FIG. 9 will clarify the action of program counter 115. This figure presents the portion of the computer flow diagram relevant to the sorting process and shows how the step operations are arranged in sequence to sort when the coded command "sort" is programmed into the computer by the operator. As noted in FIGS. 9 and 9*a*, each of the step operations is represented in the flow diagram by a block identified by a number, such as PC#456, of program counter 115. Each such block represents diagrammatically a set of logical operations to be performed serially by diode network 125 on information passing through arithmetic unit 114 during a single word period. The flow diagram extract shows how program counter 115 changes in content to automatically determine the order in which the one-word step operations are performed by the computer. The one-word step operations may repeat for several word times, depending on a binary decision; or one or another sequence may be carried out after a certain operation in a previous sequence causes a binary choice to be made. Generally, program counter 115 increases in content or "counts" in an orderly fashion as the one-word operations are sequenced from left to right on the flow diagrams. However, program counter 115 may have the same number content for more than one word, i.e., program counter 115 may "stick" in a given number as indicated, for instance, by line 131 associated with PC#456. Furthermore, program counter 115 may "skip" from one PC# to another, as indicated, for example, when it skips from PC#467 to PC#456 via line 132.

Whenever the horizontal output from a block is to be followed, program counter 115 counts to the next successive count; in FIGS. 9 and 9*a*, for example, from PC#456 to PC#457 to PC#460 (program counter 115 counts octally). On the other hand, whenever a vertical output from a word block is to be followed, program counter 115 may be controlled so as to stick in the same count or skip to a different count not the next in succession.

It is the state of flip-flop K1 (FIG. 18) at the end, or $O_{13}P_2$ position, of a word period, that determines which of the two courses program counter 115 will follow. If flip-flop K1 is false at $O_{13}P_2$, program counter 115 will count to the next higher number and the horizontal output from the block will be followed; if flip-flop K1 is true at $O_{13}P_2$, program counter 115 will stick or skip and the vertical output from the block will be followed. The state of flip-flop K1 at $O_{13}P_2$ is the result of a number of conditional processes, one of which occurs during every word period and which will be presented hereinafter.

Still with reference to FIG. 1, the circuitry corresponding to a particular count of program counter 115, as is well known in the art, is made effective in accordance with the states of the flip-flops N1 through N9. The arrangement adopted by the program counter is defined by trigger logical equations for each of the grids of flip-flops N1 through N9 in accordance with the various functions to be performed. The flip-flops are interconnected by a logical counting network causing them to operate as a binary counter whose outputs indicate PC#'s. Since flip-flop K1 is controlled in turn by circuitry of arithmetic unit 114, it is apparent that mutual control occurs between program counter 115 and arithmetic unit 114.

Before considering further features of the computer circuitry concerned with the present invention, the convention of the logical methods employed herein will first be broadly outlined.

Logical propositions may be considered to be represented in circuitry by the states assumed by flip-flop circuits having two input lines and two output lines. The arrangement of such a circuit as used in the present invention will be explained by reference in FIG. 6. This circuit is designated as flip-flop K1 and its function in the circuitry of the present invention will be described hereinafter. This flip-flop circuit utilizes a pair of triode tubes such as tube 134 and tube 135. When the flip-flop is in the condition such that tube 135 is cut off and tube 134 is conducting, it is considered to be "true" (or the flip-flop is said to be storing a binary "1"). When the flip-flop is in its other condition wherein tube 135 is conducting and tube 134 is cut off, it is considered to be "false" (or the flip-flop is said to be storing a binary "0"). It is thus understood that a flip-flop is generating two terms. These terms are represented by the flip-flop output lines which are connected to the plates of the tubes and which are shown clamped at two operating potentials, +125 v. D.C. and +100 v. D.C. When the flip-flop is in a true state, the output line connected to tube 135 is at +125 v. D.C. while the output line connected to tube 134 is at +100 v. D.C. Similarly, when the flip-flop is in a false state, the output line connected to tube 134 is at +125 v. D.C., and the output line connected to tube 135 is at +100 v. D.C. In order to trigger the flip-flop, signals in the form of negative-going pulses are applied thereto on separate input lines coupled to the grid of each of the flip-flop tubes in accordance with the convention that the grid of tube 135 must be pulsed in order to trigger the flip-flop into its true state, and that the grid of tube 134 must be pulsed in order to trigger the flip-flop into its false state.

The nomenclature employed herein uses the combination of a capital letter followed by a numeral or small case letter for designating a proposition flip-flop (K1, Mw, etc.). The output of the flip-flop, which is at the high D.C. voltage (+125 v.) when the proposition is true, is characterized by the corresponding capital letter with the numeral or small case letter as a subscript ($K_1$, $M_w$, etc.); and the output which is at the high D.C. voltage when the proposition is false is similarly characterized except that a prime is affixed ($K_1'$, $M_w'$, etc.). The true input of the flip-flop, i.e., the one which, when energized, renders the proposition true, is characterized by the corresponding small case letter with the associated numeral or small case letter as a subscript ($k_1$, $m_w$, etc.); the false input, i.e., the one which, when energized, renders the proposition false, is characterized similarly except that a subscript zero is prefixed (${}_0k_1$, ${}_0m_w$, etc.).

Describing the circuit of flip-flop K1 of FIG. 6 in greater detail, as shown, triodes 134 and 135 are arranged such that the plate of each is intercoupled to the grid of the other by a resistor in parallel with a capacitor, such as resistor 136 and capacitor 137. Each plate is provided with a separate load resistor, such as resistor 138, prior to connection to +225 v. D.C.; each grid is provided with a separate grid resistor, such as resistor 139, prior to connection to −300 v. D.C. bias; and each cathode is grounded. The input to the grids of triodes 134 and 135 is from gating circuits 140 and 141, respectively, during, for instance, PC#457 of FIG. 9. The gating circuit outputs are differentiated and clipped, as for instance by differentiating circuit 142 and diode 143 associated with the grid of triode 134, such that negative pulses only are applied to the grids. The output from each triode is from the plate and is clamped between +100 v. D.C. and +125 v. D.C. by diodes, as for example diodes 144 and 145 connected to the plate output of triode 135.

As previously pointed out, the flip-flop circuit is triggered into its opposite state by applying a negative pulse to the grid of the conducting tube. If, for instance, the term $K_1$ is to be effective, it is necessary that the plate of triode 135 be high in potential. For this condition to attain, triode 135 must be cut off. Thus it is necessary to apply a negative pulse to the grid of triode 135 by providing an output from gate 141 (i.e., all of the input signals representative of terms $G_2$, $M_w$, $O_0$ and C must be simultaneously at the high potential of +125 v. D.C.). At the end of the pulse period, the clock pulse will abruptly drop to the ineffective potential +100 v. D.C., which change in potential, after differentiation, will produce the requisite negative-going pulse. It follows that flip-flop K1 will enter period $O_1$ in a true state. It should be noted that, if flip-flop K1 were already true during $O_0$, triode 135 would already be cut off and the negative pulse supplied by gate 141 would have no effect. In this case, the only way to change the state of flip-flop K1 would be to pulse the grid of triode 134 by providing an output from gate 140.

For the presentation of other flip-flop circuits, resort will be made to block diagrams to represent the schematic form as, illustrated by FIG. 7 for flip-flop K1, and the logical equations which define when and how the flip-flop circuit is to change will be shown below the block diagram. It will be noted that, for simplicity, the program counter terms effective for the $k_1$ and ${}_0k_1$ equations used as illustrative of nomenclature have been omitted.

The action of flip-flop K1 in accordance with the equation shown will be further explained by the waveforms of FIG. 8. These graphs show how flip-flop K1 is triggered true from a prior false condition at the end of period $O_0$. Line I represents clock signal C. Line II shows the states of O counter 118, which defines the period $O_0$ during which diode network 125 is arranged by program counter 115 to make flip-flop K1 responsive to clock signal trigger pulses which will take effect provided flip-flops G2 and *Mw* are both true. In lines III and IV flip-flops G2 and *Mw* are shown to be both true only at $O_0P_2$; the dashed lines of the $G_2$ and $M_w$ curves signify that the states of flip-flops G2 and *Mw* at times other than during period $O_0$ are irrelevant for this example. It is thus at $O_0P_2$ only that an effective true input $k_1$ (line V) will be generated. However, flip-flop K1 will be triggered true only by a negative-going pulse applied to its true grid. This pulse occurs, as shown in line VI, when the $k_1$ input sharply drops to the low potential at the end of $O_0P_2$. The small positive-going pulse at the beginning of the first half of $O_0P_2$ has no effect on flip-flop K1 since tube 135 (FIG. 6) is already conducting. Thus, as line VII shows, the output $K_1$ swings to a high potential at $O_1P_0$. It is noted that flip-flop K1 will remain in the true state until triggered in accordance with the ${}_0k_1$ equation of FIG. 7.

As previously stated, the computer logical operations are represented in the form of logical equations using the notation of Boolean algebra. A logical equation for the grid triggering of a flip-flop circuit consists of stating the terms which have to be effective, i.e., of a high potential during a clock period, in order that the flip-flop circuit will trigger into a particular state at the end of the clock period. Two operations are used in forming the equations. The first, "logical multiplication," means that all the terms in the particular product have to be of a high potential in order to make that product effective in a particular equation, and is accomplished in a circuit known as a logical product network (gate). The second, "logical addition," means that at least one term of the sum has to be of a high potential in order to make that sum effective in a particular equation, and is accomplished in a circuit known as a logical sum network (mixer). Logical product and sum networks will next be described by reference to FIG. 18 which shows, for the sorting process, the complete triggering equations, block diagram, and circuitry for flip-flop K1. Thus, for example, the equation effective during PC#456:

$$k_1=(G_2'H_2'+G_2M_w)O_{0-1}C$$

is interpreted as meaning that flip-flop K1 will be triggered into the true state at the end of the clock period during which the terms $(G_2'H_2'+G_2M_w)$ and $O_{0-1}$ are at a high potential, where $(G_2'H_2'+G_2M_w)$ itself will be at a high potential whenever both the terms $G_2'$ and $H_2'$, or both the terms $G_2$ and $M_w$ are simultaneously of a high potential.

FIG. 18 shows the logical networks, namely, product networks such as 146, which are used to generate the trigger equations for flip-flop K1. Product network 146 is comprised of three input crystal diodes 147, 148, and 149 joined to a common junction 150 connected through a resistor 151 to the potential source of +225 v. These diodes are orientated such that whenever the input signals on all diodes are at the high potential of +125 v., output 152, connected to common junction 150, is at the high potential of +125 v. Any time at least one of the diode inputs has the low signal potential of +100 v. thereon, output 152 is at this low signal potential.

Output 152, it is seen, comprises one input to a logical sum network 153. This sum network is comprised of three input crystal diodes 154, 155, and 156 joined to a common junction 157 which is returned to ground through resistor 158. These diodes are orientated so that whenever the signals on any one of the inputs is at the high potential of +125 v., output 159 of the sum circuit, connected to the common junction 157, is at the high potential of +125 v. When none of the inputs is high in potential, output 159 is at the low potential of +100 v.

More particular reference will next be made to FIGS. 9 and 9*a*, an extract of the computer flow diagram relevant to the sorting process of the present invention. This figure shows how the step operations rendered effective by program counter 115 are arranged to record in registers of sort address channel 110 numerals indicating the relative magnitude of sorting data in corresponding registers of memory channel 111. As FIGS. 9 and 9*a* indicate, within the rectangle representing each word time block, concise statements appear defining the activity during that word period. Below each of the blocks, logical equations are presented which define how the statements made within the rectangle are precisely stated in terms of the computer. It should be pointed out that not all of the propositions previously noted in connection with FIG. 5 as being generated by arithmetic diode network 125 are needed in order to accomplish the operations performed during a word period. Thus equations are listed below each word block for only those propositions which are effective during the word periods of a block. In the subsequent description, it may be considered that if one of the propositions shown feeding out of the right of diode network 125 of FIG. 5 is not generated during a word period, it is equal to zero, i.e., ineffective, for that word period.

It will be seen that certain operations and, therefore, certain forms of the logical equations occur in more than one word time block. As described, the scheme of the present invention provides circuitry for physically generating logical products and logical sums. Thus, by mere reference to an equation, the arrangement of the circuitry for generating the equation can be set up directly. However, it is not necessary for a logical combination of terms to be generated more than once. Thus, when a particular equation is used in several word time blocks, it is only necessary to provide circuitry for generating this equation once, and then to logically multiply the output with the PC#'s which define when it is to be operative. The simplification of the equations, and, therefore, diode networks by this means results in a reduction of the number of terms and components required. Thus, it is seen that the equation $F_0=F_2$ occurs for every PC# block in FIGS. 9 and 9*a*. The PC#'s for these blocks are logically summed by the diode networks shown in FIG. 15, generated as two separate functions and designated simply as PCS1 and PCS2 (program counter sum 1 and program counter sum 2, respectively). These functions are employed as inputs to the logical gates or mixers represented by the appropriate equations.

In the discussion of FIGS. 9 and 9*a* that follows, this simplification will become evident if reference is made, where desired, to FIGS. 16 through 24, which show all diode networks, block diagrams, and logical equations for generating the logical propositions referred to in connection with FIGS. 9 and 9*a*.

In FIGS. 9 and 9*a* it is seen that the blocks of the complete computer flow diagram which accomplish sorting are PC#455 through PC#467 (octal numbering). It is to be noted that, upon entering PC#455, all relevant flip-flops are false, the sort command has been detected, and computer look-up and other routines have been programmed to arrange the recirculating registers to correspond with the sorting problem. Thus, recirculating in the F register are binary digit ones in binary digit positions only corresponding to the binary digit positions of the sort control words in which the items to be sorted are located (the sorting digits), and over which sorting comparisons are to be made; an example is shown in FIG. 12. Recirculating in the first two octal digit periods of the G register are binary digits corresponding to the code for the entry length in words; FIG. 14 shows these codes for the four entry length 1, 2, 4, and 8 words for which the present computer is designed, and FIG. 11 shows the code for an entry length of four words as it appears in the G register. The present computer employs the first two octal digit periods of the H register as a word counter; for this purpose, before PC#455 is entered, these periods of the H register have zeros in recirculation, as shown in FIG. 10. The content of the E register prior to PC#455 is immaterial since, during PC#455, the first sort control word will replace the content; an example is shown in FIG. 13.

Briefly, FIGS. 9 and 9*a* show that the first sort control word is read from the first entry of memory channel 111 into the E register where, as a standard, it is compared in arithmetic unit 114 with each of the other words in the channel. The comparison is made only for the sorting digits specified by the F register. Entry counter A1—A6 tabulates in units of entry length each comparison with another sort control word with sorting digits smaller in magnitude than those of the standard, and the H register word counter increases its content by one unit each word period that the comparison is progressing. The last entry of the channel is identified and when it has passed through arithmetic unit 114, the output of a logical adder made effective by entry counter A1—A6 is recorded into sort address channel 110. Subsequently, the other sort control words are located in turn and read from the respective entries of memory channel 111 into the E register and utilized as comparison standards in a process similar to that for the first sort control word with two exceptions. Firstly, the content of entry counter A1—A6 is also increased where the sorting digits of a standard are equal to those of the other sort control words which have already acted as standards. Secondly, recording into sort address channel 110 is done when the last word of the entry preceding that containing the standard sort control word has passed through arithmetic unit 114. When the last sort control word of the channel has been thus used as a standard, the sorting process automatically halts and the computer returns to a rest condition, PC#0, to await further instructions.

Referring to PC#455 of FIG. 9 more particularly, the statement is made that the F and G registers are recirculated. This is represented by the equations $F_0=F_2$ and $G_0=G_2$, as discussed in connection with FIG. 5. Thus, the binary digit ones of the F register defining the location of the sorting items and the entry length code of the G register are made available each word period. It will be noted that these equations are operative during the entire word period. Where such is the case, the timing term $O_{0-13}$ will not be included. It will also be noted that, for simplicity, the PC# during which an equation is effective has been omitted from the equation, although the PC# appears as a logical multiplier in the appropriate diode networks shown in the drawings.

Next in block PC#455 it is stated that the output of flip-flop M1 is read into the E register. It will be noted that the word passing through arithmetic unit 114 during PC#455 is the first sort control word of memory channel 111, the address of which had been previously looked up by techniques well understood. The digits of this word are sensed by head 127, the output of which triggers flip-flop M1 and diode network 125 is arranged by program counter 115 to read the output of flip-flop M1 into the E register by the equation $E_0=M_1$. The first sort control word in the channel thus becomes the first standard sort control word with which succeeding words of memory channel 111 will be compared. It is noted that this process does not affect the content of the storage register in the memory occupied by this sort control word; the digits of the E register are simply arranged to correspond to this content.

The next statement made in PC#455 indicates that period $O_{0-1}$ of the H register is set up as a counter. The function of the H register, with reference to the sorting process, is to serve as a binary counter to which a unit is added each time a word passes through arithmetic unit 114, commencing with the first sort control word. Since, during PC#455, the first sort control word is present, this word counter is arranged to have a count of one unit by the equation $H_0=O_0P_0$, which inserts a binary digit one in the least significant binary digit position of this counter.

Next in PC#455 it is noted that flip-flops A8 and A10 are set true in accordance with the equations $a_8=O_2C$ and $a_{10}=O_2C$, respectively. Flip-flop A10 is the means employed to effectuate the addition of a unit to the H register word counter and will be further discussed when the activity of PC#456 is described. Flip-flop A8, when true, indicates that the sort control words being compared with the standard have not, themselves, acted as standards; and when false, indicates the converse. Flip-flop A8, it will be seen, is set false when the word in arc 77 (last word) of memory channel 111 passes through arithmetic unit 114 by the arc 0 indicator at $O_0P_4$ of synchronizing channel **109*a***.

The succeeding statement of PC#455 is that flip-flop A12 is set true if the entry length, as shown by the G register, is one word. It has been pointed out in connection with FIG. 5 that flip-flop A12 indicates the presence of a sort control word in arithmetic unit 114. Specifically, a true state of flip-flop A12 indicates that the word presently in arithmetic unit 114 is a sort control word. It is obvious that, for one-word entry lengths, all words are sort control words. Reference to the coding in FIG. 14 will indicate that the G register contains a binary digit zero in binary digit position $O_0P_0$ for an entry length of one-word only. Accordingly, for this case, since the next word will be a sort control word, the equation $a_{12}=G_2'O_0P_0C$ detects this binary digit zero and sets flip-flop A12 true.

The next statement made in PC#455 is that flip-flop K1 remains false. As previously noted, the function of flip-flop K1 is to signal program counter 115 to count to the next count or to skip to a different count. It should be understood that the choice as to how program counter 115 should change is derived as a result of information either received or generated during each word period and set up in flip-flop K1. In the present instance, flip-flop K1 was false at the end of the word block immediately preceding PC#455 (not shown). Flip-flop K1, during PC#455, will remain false and, at the end of the word period, the computer will count out of PC#455 and enter PC#456. It is emphasized that, for a word period, it is the status of flip-flop K1 at pulse position $O_{13}P_2$ which determines how program counter 115 should change at the end of pulse position $O_{13}P_2$ and that a triggering of flip-flop K1 at the end of $O_{13}P_2$ does not affect this decision; such triggering takes effect at the beginning of the next word period.

It is in PC#456 that comparisons are made. It is here first seen that the information in the E, F, and G registers is made available each word period to arithmetic unit 114 by continuous recirculation in these registers.

Next it is seen that a unit is added each word period to the H register word counter using flip-flop A10, thereby arranging the H register word counter to indicate the number of words that have passed through arithmetic unit 114 and have been compared with the standard sort control word in the E register. This addition is accomplished by the equations: $H_0=(H_2A_{10}'+H_2'A_{10})O_{0-1}$ and ${}_0a_{10}=H_2'O_{0-1}C$. This is interpreted as meaning that output proposition $H_0$ from arithmetic diode network 125 simultaneously observes the contents of flip-flops H2 and A10. When they are different, as when adding (1+0), the equation is satisfied and a 1 is recorded in the H register during $O_{0-1}$. When they are the same, as when adding (0+0) or (1+1), the equation is not satisfied and a 0 is recorded in the H register. Flip-flop A10 goes false at the end of the first clock period during which flip-flop H2 is observed to be false, and remains false for the remainder of the counting portion of a word period. The result of this operation is that a unit is added to the binary number representative of the word count in the H register each word period.

Next it is noted that in each word period in PC#456, a determination is made to ascertain whether, during the following word period, a sort control word will pass through arithmetic unit 114. If this is so, flip-flop A11 remains false as set at the end of the previous word period; otherwise, flip-flop A11 is set true. The determination is made during period $O_0$ from information in the G and H registers. Regardless of the entry length and, accordingly, the coding therefor recirculating in the first two octal digit periods of the G register (FIG. 14), only when the count in the H register has, during period $O_0$, binary digit ones in binary digit positions corresponding to every binary digit one of the G register will flip-flop A11 fail to be triggered true in accordance with the equation $$a_{11}=G_2H_2'O_0C$$

It follows that only when the H register has counted to an entry length will this equation not hold and the false state of flip-flop A11 be perpetuated, thereby indicating that the next word to pass through arithmetic unit 114 is a sort control word. If, for a word period, however, the H register has not yet counted to an entry length, there will be, during a pulse position in period $O_4$, a binary digit one in the G register and a binary digit zero in the H register and flip-flop A11 will trigger true, thereby indicating that the next word to pass through arithmetic unit 114 is not a sort control word. The state of flip-flop A11 is utilized by flip-flop A12 which, as stated, is set at the end of each word period conversely to flip-flop A11: $a_{12}=A_{11}'O_{13}P_2C$, ${}_0a_{12}=A_{11}O_{13}P_2C$, and therefore is true during a word period only if the word passing through arithmetic unit 114 is a sort control word.

The next statement in PC#456 requires that flip-flop A8, previously set true during PC#455, be set false when arithmetic unit 114 senses the arc 0 indicator of synchronizing channel 109*a*. It has been pointed out that the last word (the word in arc 77) of memory channel 111 is sensed in arithmetic unit 114 when flip-flop M*w* is reading the arc of arc address channel 109 coded with the address O (FIGS. 1 and 4). It follows that, since the first standard sort control word is from the first entry in the channel, all sort control words sensed, i.e., passing through arithmetic unit 114 prior to the time that the arc 0 indicator is sensed, have not themselves yet served as standards, but all sort control words passing through arithmetic unit 114 subsequent to the time that the arc 0 indicator is sensed have already served as standards. Flip-flop A8 is caused by arithmetic diode network 125 to be triggered false from its prior true state in accordance with the equation ${}_0a_8=M_8O_0P_0C$, thereby marking the time that the arc 0 indicator is sensed. As will be shown, the state of flip-flop A8 is utilized in that, if true, a comparison of the standard sort control word with another word will be considered successful only if the standard is the larger; but, if false, the comparison will be considered successful if the standard is larger than or equal to the other word.

The following two statements in PC#456 indicate that the contents of the E register (standard sort control word) is serially compared with the output of flip-flop M1 each word period for only those binary digit positions corresponding to those of the F register with binary digit ones, which, it will be recalled, identifies the sorting items of the entries. This comparison may thus be effective during the entire word period except for pulse position $O_{13}P_2$ and is represented by the equations:

$$a_9=[E_2M_1'F_2O_{0-13}(O_{13}P_2)'+A_8'O_{13}P_2]C$$
$${}_0a_9=[E_2'M_1F_2O_{0-13}(O_{13}P_2)'+A_8O_{13}P_2]C$$

It is the intent of these equations to cause flip-flop A9 to be true at the end of a word period during which a comparison has been successful (as previously defined) or false at the end of a word period during which a comparison has been unsuccessful. The first terms of the equations indicate that a digit by digit examination is made of the sorting digits (binary digit ones of the F register) of a word passing through arithmetic unit 114 and of the E register, and, for a binary digit position, if $E2>M1$, flip-flop A9 is triggered true; if $E2<M1$, flip-flop A9 is triggered false; and if $E2=M1$, flip-flop A9 is not triggered. Thus, if the sorting item of the standard sort control word is the larger, flip-flop A9 will be true at the end of the word period; if the sorting item of the standard sort control word is the smaller, flip-flop A9 will be false at the end of the word period; and if the sorting items are equal, the state of flip-flop A9 will not change during the word period. The second terms of the equations establish the state of flip-flop A9 at the beginning of the word period conversely to the state of flip-flop A8 at the end of the prior word period. Thus, if the arc 0 indicator had not been sensed prior to a word period, during the word period flip-flop A8 will be true, and at the beginning of the word period flip-flop A9 will be false. But, if the arc 0 indicator had been sensed prior to a word period, during the word period flip-flop A8 will be false, and at the beginning of the word period flip-flop A9 will be true. Since, as stated, flip-flop A9 is not triggered if $E2=M1$, it follows that where the sorting item of the standard sort control word is compared with an equal sorting item in a word which has already served as standard, flip-flop A9 will be true at the end of the word period. In other words, for each word period occurring before the arc 0 indicator is sensed, flip-flop A9 will enter false and leave false unless $E2>M1$, for which case it will leave true. Additionally, for each word period occurring after the arc 0 indicator is sensed, flip-flop A9 will enter true and leave true unless $E2<M1$, for which case it will leave false; and, necessarily, it follows that if $E2=M1$, flip-flop A9 will leave true. It will be shown that a count is to be made in entry counter A1—A6 only if flip-flop A9 is true at the end of a word period.

Thus, in summary, at the end of each word passing through arithmetic unit 114, it is known whether or not a count is to be made in entry counter A1—A6. The next statement in PC#456 specifies that this information is transferred to flip-flop A7. Accordingly, the equation $a_7=A_9A_{12}O_{13}P_2C$ triggers flip-flop A7 true if, as flip-flop A9 shows, a successful comparison was made during the previous word period, and, as flip-flop A12 shows, the previous word was a sort control word.

Next in PC#456 is the statement requiring the addition to counter A1—A6 of one entry length, represented by the equations:

$$a_6=[A_1(A_7'+G_2)+A_1'A_7G_2']C$$
$$_0a_6=[A_1'(A_7'+G_2)+A_1A_7G_2']C$$
$$_0a_7=[A_1'G_2'O_{0-1}(O_1P_2)'+O_1P_2]C$$

It has been pointed out that flip-flops A1—A6 operate as a counter. Input to the counter can be made only through flip A6, and on successive clock pulses, the content of a flip-flop in the counter is made to correspond to that of the preceding flip-flop in the counter for the preceding pulse position. In other words, flip-flop A5 "follows" flip-flop A6, flip-flop A4 "follows" flip-flop A5, etc. It will be recalled that the number of counts that a standard sort control word accumulates in counter A1—A6 is a measure of the magnitude of its sorting datum as compared with those of the other sort control words of the channel. It is desired that, where flip-flop A7 is true at the end of a word period (a successful comparison was made with another sort control word during that word period), if the entry length is one word, a unit be added in the $2^0$ place of counter A1—A6; if the entry length is two words, a unit be added in the $2^1$ place of counter A1—A6; if the entry length is four words, a unit be added in the $2^2$ place of counter A1—A6; and if the entry length is eight words, a unit be added in the $2^3$ place of counter A1—A6. It will be seen from FIG. 14 that the place in which a unit is added to counter A1—A6 corresponds, for each entry length, to the binary digit position in the G register where the first binary digit zero appears; the presence of a binary digit zero in the G register thus is employed to enable additions to counter A1—A6, which are made if flip-flop A7 is true at the end of the previous word period. Stated in another way, for a pulse position, if flip-flop A7 is false or if the G register has a binary digit one, flip-flop A6 follows flip-flop A1 and no addition is made; if flip-flop A7 is true and if the G register has at least one binary digit zero, flip-flop A6 follows the complement of flip-flop A1 thereby making additions in the place of the counter corresponding to the binary digit position of the G register with the first binary digit zero, until flip-flop A7 is set false at either $O_1P_2$ or at the first binary digit position at which flip-flop A1 is false and the G register has a binary digit zero, as shown by the $_0a_7$ equation above; and afterwards, flip-flop A6 again follows flip-flop A1. The similarity of this technique of addition to that for adding a unit each word period to the H register word counter is apparent.

Next in this block is the statement that flip-flop R1 is set true at the end of the last word in that block, i.e., at the end of the word period in which flip-flop K1 is false for period $O_{13}P_2$: $r_1=K_1'O_{13}P_2C$. As mentioned in connection with FIG. 5, flip-flop R1, when true, permits record propositions $R_0$ and $R_0'$ to be recorded in sort address channel 110. This technique utilizes flip-flop R1 as gating means for these propositions and is an established practice in the art. The gate is opened by setting flip-flop R1 true since the next block, PC#457 of FIG. 9*a*, is that in which recording is done.

The last statement in PC#456 of FIG. 9 indicates the condition for which program counter 115 will cause the computer to count out of this block, that is, after the last word of the entry preceding that containing the standard sort control word has passed through arithmetic unit 114. The equations by which this action is represented are:

$$k_1=(G_2'H_2'+G_2M_w)O_{0-1}C$$
$$_0k_1=O_{13}P_2C$$

As already pointed out, for $O_{13}P_2$ of a word period, if flip-flop K1 is false, program counter 115 will count, but if flip-flop K1 is true, program counter will deviate ("stick" in the same count for the case of PC#456). The sequencing scheme employed here is to set flip-flop K1 false at the end of each word period and if, during the next word period, the word in arithmetic unit 114 is not the last word of the entry preceding that containing the standard sort control word, flip-flop K1 is set true, but, if it is, flip-flop K1 is permitted to remain false. From the $k_1$ triggering equation, it is seen that this information is obtained during period $O_{0-1}$ from the G and H registers and arc address channel 110. It will be recalled that period $O_{0-1}$ of the H register is counting a unit each word period. Thus, period $O_1$ of the H register will contain at least one binary digit zero for each count up to and including count 110 111 (67) to correspond with a binary digit zero in period $O_1$ of the G register, thereby satisfying the first portion of the equation: $k_1=G_2'H_2'O_{0-1}C$. From count 111 000 (70) through count 111 111 (77) of the H register, this equation will not be satisfied for at least one of the codes representing the values of entry length (FIG. 14). However, a comparison of these codes with the arc address output of flip-flop $M_w$ for the word periods corresponding to counts 70 to 77 of the H register will indicate that, except for count 77 (the last word of the last entry), flip-flop $M_w$ will be true at a time corresponding to at least one binary digit position during period $O_0$ of the G register containing a binary digit one, thereby satisfying the second portion of the equation:

$$k_1=G_2M_wO_{0-1}C$$

since, in the computer design embodying the invention, entries are stored beginning in arcs with addresses ending in 000, 00, or 0 for entry lengths of 8, 4, or 2, respectively. To summarize, flip-flop K1 will be triggered false at the end of each word period, thus causing program counter 115 to count to PC#457 at the end of the next word period, provided that it is not triggered true during the first two octal periods of the next word period thereby causing program counter 115 to stick in count PC#456, and this contingency will occur if the word presently passing through arithmetic unit 114 is part of an entry other than that preceding the one containing the standard sort control word or if this word is not the last word of an entry.

Referring next to FIG. 9*a*, the function of PC#457 is mainly to provide for recording the output of a logical adder made effective by entry counter A1—A6, into sort address channel 110.

It will be noted first that all four registers E, F, G, and H are recirculated and that the content of the first three remain as before. The H register word counter during PC#457 is comprised of the binary digits representing the count attained during the word period of PC#456 when the last word of the entry preceding that containing the standard sort control word was in arithmetic unit 114. In other words, the content of the H register word counter during PC#457 is 0 for one-word entries, 77 or 0 for two-word entries, a number from 75 to 0 for four-word entries, and a number from 71 to 0 for eight-word entries. For two-word, four-word, and eight-word entries, the actual content depends, of course, on the position of the sort control word in the entry.

It should be understood that the computer enters PC#457 at the beginning of the first word of the entry whose sort control word had been employed as a standard during PC#456 and that the computer sticks in PC#457 for a number of word periods equal to the entry length. During the first word period of PC#457, it is desired that the content of entry counter A1—A6 be increased by one entry length if necessary, and, simultaneously therewith, the output of the logical adder be recorded into sort address channel 110. During the subsequent word periods of PC#457, it is desired that the content of entry counter A1—A6 be increased by one unit (add one to the $2^0$ position) and, simultaneously therewith, the output of the logical adder be recorded into sort address channel 110. Techniques for recording the output of a logical adder without a time delay, although one or more inputs to the logical adder are changing, are well established. For the purpose of the present invention, it should suffice to indicate with reference to FIG. 26 that the terms of the $a_6$ and $_0a_6$ triggering equations in PC#457, representing inputs $R_0$ and $R_0'$ to the logical adder, are logically combined during each clock period in diode network 125 of arithmetic unit 114, and the output of the logical adder, comprising two voltage level information applied to gating circuit 116, is subsequently recorded provided that flip-flop R1 is true. It is for this reason that flip-flop R1 is allowed to remain true throughout PC#457 and is triggered false in accordance with the equation $$_0r_1=K_1'O_{13}P_1C$$

during the last word period of PC#457, at the end of which the computer is to enter PC#460, since recording is no longer required.

Referring to the operation of the triggering equations for flip-flop A6 during the first word period of PC#457 more particularly, counter A1—A6 is caused to count one entry length if flip-flop A7 were true at the end of the last word period of PC#456, since during the last word period of PC#456, a sort control word may have been compared with the standard and the comparison may have been successful. It will be noted that flip-flop A8 enters the first word period of PC#457 in the false state, thereby permitting this addition. For this case then, the content of entry counter A1—A6 is increased by one entry length.

If, however, during the last word period of PC#456, either the word in arithmetic unit was not a sort control word or the comparison made was not successful, flip-flop A7 will enter PC#457 in a false state, flip-flop A6 will follow flip-flop A1, and thus the content of entry counter A1—A6 is not affected.

The rest of the statement referring to entry counter A1—A6 indicates the addition of a unit thereto during each subsequent word period in PC#457, using flip-flop A8. It is noted that this unit addition is accomplished by the second term in the $a_6$ and $_0a_6$ triggering equations and the equations $a_7=O_{13}P_2C$ and $a_8=O_{13}P_2C$ in a fashion similar to the unit additions to the H register word counter previously described.

The next statement indicates that the recording is made into sort address channel 110. This is accomplished by causing diode network 125 to make recording propositions $R_0$ and $R_0'$ responsive to the output of the logical adder previously mentioned. No equation is shown for this action since recording techniques of this type are well established in the art. The next statement, specifying that flip-flop R1 be set false during the last word period, $_0r_1=K_1'O_{13}P_1C$, provides for closing gating circuit 116 at this time so that recording propositions $R_0$ and $R_0'$ can no longer be recorded.

The next statement in PC#457 concerns flip-flop A9, requiring that it be set false at the beginning of the word period during which the arc 0 indicator is sensed: $_0a_9=M_sO_0P_0C$. It should be noted that the entry whose sort control word is presently being handled may be the last entry in the memory channel. If so, the arc 0 indicator will be sensed during the word period of PC#457 that the last word of the entry is in arithmetic unit 115. Flip-flop A9 enters from PC#456 in the true state and is set false by the above equation if the arc 0 indicator is sensed, i.e., if the sort operation has been completed. As will be shown, the state of flip-flop A9 is employed during subsequent program counter blocks.

The last statement of PC#457 provides for counting out at the end of the last word of the entry, and the equations therefor, $k_1=G_2M_wO_0C$ and $_0k_1=O_{13}P_2C$, are noted to have been discussed in connection with PC#456.

During PC#460 to PC#467, activity is devoted to locating the next sort control word and setting it up as a standard in the E register. During each of these blocks, the word coming from the memory through flip-flop M1 is recorded into the E register and, if it is a sort control word, a program counter skip is made back to PC#456; but, if it is not a sort control word, a count is made to the succeeding block. It is noted that the search for sort control words may require at most eight word periods (for the case of entry length of eight words) and thus 8 blocks are provided in the chain.

The statements and equations in each of the blocks PC#460–467 are identical and were discussed in connection with PC#456 (FIG. 9) with the exception of the statements indicating that flip-flop A8 is set false if the arc 0 indicator is sensed, that flip-flop A9 is preset for use in PC#456 and, if flip-flop A9 is true and the next word to be sensed is a sort control word (flip-flop A12 is true) a skip back to PC#456 is to be made. It should be apparent that, if flip-flop A9 enters PC#460 in the false state, sorting has been completed. Since there is no equation in this block for triggering this flip-flop to the true state, it remains false and, as will be shown, the computer will sequence through PC#'s 460–467 to the rest condition (PC#0). However, if flip-flop A9 enters PC#460 in the true state, it is an indication that at least one entry remains to be sorted. For this condition, as will be shown, the computer will skip back to PC#456, where, it will be recalled, flip-flop A9 is triggered in accordance with the results of the magnitude comparison. For this purpose, flip-flop A9 must be preset false if the next sort control word (which will be compared to the standard sort control word in PC#456) has not already served as a standard. This is accomplished by operation of the equations $_0a_3=M_sO_0P_0C$ and $_0a_9=A_8K_1C$. The former equation, as previously discussed, sets flip-flop A8 to indicate the sensing of the arc 0 indicator in accordance with whether or not the sort control word of the next entry has already served as a standard. The latter equation allows flip-flop A9 to remain true unless the arc 0 indicator is sensed and there is to be a skip back to PC#456 (flip-flop K1 is true). The skip, of course, is conditioned on whether or not the next word is a sort control word. If so, flip-flop A12 will be true and flip-flop K1 will be triggered true: $k_1=A_9A_{12}C$. In summary, if flip-flop A9 had been set false in PC#457 (all sorting has been done) or if flip-flop A12 is triggered false at the end of each word period of PC#'s 460–467 (the word is not a sort control word), the false state of flip-flop K1 is perpetuated and program counter 115 does not cause a skip back to PC#456.

It should be noted that a skip is made to PC#456 from PC#460 for one-word entries, from PC#460 or PC#461 for two-word entries, from a block of the group PC#460 to PC#463 for four-word entries and from a block of the group PC#460 to PC#467 for eight-word entries. The precise block from which the skip will be made for two-, four-, and eight-word entries will, of course, depend on the position of the sort control words in the entries. In each case, however, the content of the H register word counter on entering PC#456 will be 000 001 (1).

It is noted that, as described above, a count out of PC#467 occurs when all sort control words of the channel have been employed as standards and that this count directs the computer into PC#0, a rest condition as aforementioned.

An illustration of the sorting system of the present invention will next be given with particular reference to FIGS. 1 and 11 to 13*a*. These figures are concerned with an accounting system set up for a retail selling operation by a chain store company. Individual sales within the stores are recorded at the point of transaction on a medium, such as tape. These sales tapes are collected at periodic intervals and brought to the computer at the store accounting center for processing preliminary to preparing a daily selling report and up-to-date inventory record. Generally, the order in which the information is stored on the tapes and the order in which the information must be presented by the computer are different; exceptions to the general case occur very infrequently and are not handled differently by the system.

In the example shown in the figures, the company requires a daily summary of its transactions by items such as department, salesclerk, stock number, number of sales, manufacturer, style, color, and size for each of its stores. This information for each transaction comprises one entry on the tapes. The entries are programmed into memory channel 111 of the computer in the order in which they appear on the tape and, as shown in FIG. 1, occupy successive storage registers. For this case, four storage registers are required for each entry, and the code for the entry length of four (000 011 of FIG. 14) is inserted and recirculated in period $O_{0-1}$ of the G register as shown by FIG. 11. It will be assumed that the item in accordance with which a sort is to be made is the stock number, located in period $O_{2-4}$ of the second word of each entry (words 1, 5, 11, etc., of FIG. 1), and the F register, shown in FIG. 12, is programmed to contain binary digit ones only in period $O_{2-4}$ thereof to correspond. It is to be noted that the command "sort" has also been programmed into the computer and that the address contained therein corresponding to the storage register with the first sort control word (word 1) has been looked up.

Thus, during PC#455 of FIG. 9, the first sort control word is being picked up by flip-flop M1 of arithmetic unit 114, and diode network 125 has connected proposition $E_0$ to the output of flip-flop M1, thereby recording word 1 into the E register as the first standard sort control word, as FIG. 13 illustrates. Also during PC#455, the H register, which, as shown in FIG. 10, has been recirculating with binary digit zeros in period $O_{0-1}$, is arranged as a word counter with a count of one by the insertion of a binary digit one in position $O_0P_0$. Flip-flop A12 remains false since the G register contains a binary digit one in position $O_0P_0$, indicating that the entry length involved is not one word. PC#456 is entered and item comparison begins.

The stock number in period $O_{2-4}$ of the E register is compared with the number in period $O_{2-4}$ of every other storage register of the channel (63 "sticks" in PC#456), and each word period of PC#456 is tolled by an increase of one unit in the H register word counter. During the first octal period of each word period, flip-flop A11 observes the G and H registers and triggers true, except during word periods for which the period $O_0$ content of the H register has a digit 1 in every position for which the period $O_0$ content of the G register has a digit 1, i.e., when the first word of each entry is in arthmetic unit 114 (words 4, 10, etc.). Thus, flip-flop A11 indicates that the next words (words 5, 11, etc.) are sort control words, and flip-flop A12 is triggered true to correspond.

Assume, for example, as shown in FIG. 13*a*, that the stock number of the present (first) entry is the third smallest of those in the channel; that the stock number of the second entry (occupying arcs 4, 5, 6, and 7) is the largest; that the stock number of the third entry (occupying arcs 10, 11, 12, and 13) is the smallest; and that the stock number of the last entry (occupying arcs 74, 75, 76, and 77) is the second largest. When the sorting digits of the first sort control word are compared to those of all other words in the channel, flip-flop A9 will show a successful comparison for two sort control words, one of which is the third sort control word (word 11) and the other of which is not shown. A binary digit one will enter the $2^2$ position of entry counter A1—A6 for both comparisons and the status of the entry counter will change from 000 000 (0) to 000 100 (4) and thence to 001 000 (10). For this example, during word 77 only, the H register word counter will have counted to 111 111 and the arc address to which flip-flop M*w* is responding is 0; a comparison of each with the G register for the first two octal digits indicates that the $k_1$ triggering equation is not satisfied and thus PC#457 (FIG. 9*a*) is entered.

Here, since during PC#456 word 77 was not a sort control word, no further count is made in entry counter A1—A6 for the first word period and recording of the logical adder output, 001 000 (10), is made in arc 0 of sort address channel 110. The computer sticks in PC#457 for the three following word periods, during each of which this count is increased by one unit and recorded into arcs 1, 2, and 3 of sort address channel 110, which thereby contain 001 001 (11), 001 010 (12), and 001 011 (13), respectively. During the four word periods of PC#457, the H register word counter, due to recirculation of the H register, maintains the count which it contained upon leaving PC#456, namely, 111 111. During the word periods in which the numbers 001 001 (11) and 001 010 (12) are recorded into sort address channel 110, flip-flop K1 has been triggered true. In the case of the former, the code from arc address channel 109 was 000 010, making flip-flop M*w* true at $O_0P_1$ to coincide with the binary digit one in the G register; in the case of the latter, the code from arc address channel 109 was 000 011, making flip-flop M*w* true during $O_0P_{0-1}$ to coincide with binary digit ones in the G register. During the word period of the last word of the entry (word 3) only, when the number 001 011 (13) is recorded into sort address channel 110, flip-flop K1 has remained false, the $k_1$ triggering equation not having been satisfied since the code from arc address channel 109 was 000 100 and thus, for no binary digit position of the first octal period has there been a binary digit one in the G register when flip-flop M*w* was true. At this point the activity of word 1 as a standard sort control word is completed, and the computer enters PC#460.

During this word period, word 4 is transferred to the E register but flip-flops A11 and A12 indicate that this is not a sort control word. Flip-flop K1 is not triggered true, and the computer enters PC#461.

During PC#461, word 4 is replaced in the E register by word 5 which, as flip-flops A11 and A12 indicate, is a sort control word. Flip-flop K1 causes a skip back to PC#456 where the sorting process is repeated, this time with word 5 as a standard, resulting in the tags 111 100 (74), 111 101 (75), 111 110 (76), and 111 111 (77) appearing in arcs 4, 5, 6, and 7, respectively, of sort address channel 110, as shown in FIG. 13*a*.

When the sort control word (word 75) of the last entry in the channel has been employed as a standard sort control word and the tags for the words in the last entry have been recorded into sort address channel 110, the arc 0 indicator will trigger flip-flop A9 false at the beginning of the word in PC#457 during which word 77 is passing through arithmetic unit 114. Flip-flop K1 will remain false throughout the sequence PC#460–PC#467 and the computer will return to the rest condition (PC#0).

It should be obvious that the scheme of the present invention can be employed to sort entries insufficient in number to occupy all of the storage registers of a channel by programming the entries at the end of the channel and filling all storage registers not occupied by entries with binary digit ones.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A system for determining the relative magnitude of each of a plurality of coded numbers comprising: a cyclical memory in which coded signals representing said numbers are stored; a recirculating register synchronized to advance with said cyclical memory; means for setting up in said recirculating register coded signals representing one of the numbers stored in said cyclical memory; comparing means for successively comparing the number set up in said recirculating register with the numbers in said cyclical memory, each in its turn; and a counter responsive to said comparing means for producing a count which count after a comparison with all said numbers represents the relative magnitude of the number in said recirculating register with respect to the numbers stored in said cyclical memory.

2. A system for determining the relative magnitude of each of a plurality of coded numbers comprising: a memory in which coded signals representing said numbers are stored; a storage register; means for setting up in said register coded signals representing one of the numbers stored in said memory; comparing means for comparing the number set up in said register with each of the remaining numbers in said memory; a counter responsive to said comparing means for producing a count which count after a comparison with all said numbers represents the relative magnitude of the number in said register with respect to the numbers stored in said memory; and means for assigning said count to the number used as the standard of comparison by storing said count as coded signals in said memory.

3. A system for assigning indicia of relative magnitude to a plurality of coded numbers comprising: a cyclical memory in which coded signals representing said numbers are stored; a recirculating register synchronized to advance with said cyclical memory; means for setting up coded signals representing one of the numbers of said cyclical memory into said recirculating register; comparing means for comparing the coded signals set up in said recirculating register with each of the coded signals in said cyclical memory representing each of said numbers; a counter responsive to said comparing means for indicating, following a comparison with all of the coded signals, the relative magnitude of the number represented by the coded signals in said recirculating register with the coded signals representing the numbers stored in said cyclical memory; and means for storing the contents of said counter representing said relative magnitude in said cyclical memory.

4. A system for assigning indicia indicative of relative magnitude to coded numbers forming portions of a plurality of entries being stored in the cyclical memory of a digital computer comprising: a channel on said cyclical memory in which coded signals representing each of said numbers are stored; a recirculating register synchronized to advance with said cyclical memory; means for successively setting up in said recirculating register coded signals representing each of said numbers represented by signals in said channel; means including comparing means for comparing the coded signals of a number presently set up in said recirculating register with the coded signals of the numbers in said channel, each in its turn, and for producing an output each time the number in the recirculating register is by the comparison determined to be greater than the numbers in said channel which have not yet been set up in said recirculating register, and equal to or greater than the numbers in said channel which have previously been set up in said recirculating register; and a counter responsive to the outputs of said comparing means for successively producing ultimate counts representing said indicia for each of the numbers whose coded signals are set up in said recirculating register.

5. A system for assigning indicia of relative magnitude to numerical entries being stored in the cyclical memory of a digital computer comprising: a channel on said cyclical memory in which coded signals representing said numerical entries are stored; a recirculating register synchronized to advance with said cyclical memory; means for successively setting up coded signals representing a portion of each of the numerical entries in said channel into said recirculating register; means including comparing means for comparing coded signals of the entry presently set up in said recirculating register with correspondingly positioned coded signals of the remaining entries in said channel, each in its turn, and for producing an output each time the numerical coded signals presently in the recirculating register is by comparison determined to be greater than the numerical coded signals of the entries in said channel which have not yet been set up in said recirculating register, and equal to or greater than the numerical coded signals of the entries in said channel which have previously been set up in said recirculating register; and a counter responsive to the output of said comparing means for producing after such comparison a final count indicative of said indicia for the entry represented by the coded signals presently in said recirculating register.

6. In a digital computer, a system for identifying each of a plurality of numbers, comprising: a cyclical memory having said numbers stored as coded signals on a first channel thereof; a recirculating register timed to advance with said first channel; means capable of setting up in said recirculating register one at a time the coded signals representing said numbers in said channel; a comparator responsive to both the coded signals of said first channel and of said recirculating register and providing output signals only for comparisons corresponding to a particular magnitude relation; a counter in which the count is changed and an output signal is generated in response to the output signal of said comparator; and recording means responsive to the final output signal of said counter after a number in the recirculating register has been compared with each number in the first channel for recording on a second channel of said memory coded signals identifying the numbers of said first channel in accordance with the particular magnitude relation to which the comparisons correspond.

7. A system for assigning indicia indicative of relative magnitude to particular ones of numbers being stored as signals in the cyclical memory of a digital computer, comprising: a channel on the memory having coded signals to represent the numbers; a register with a capacity of one number synchronized to advance with said channel; means to successively set up coded signals representing said particular ones of said numbers in said register; comparing means with an output, for comparing the signals representing the number presently in said register with each of the signals representing said particular ones of the numbers in said channel; a counter responsive to the output of said comparing means in which the count is increased for each comparison showing that the number represented by the signals presently in said register is greater than another which has not yet been represented by coded signals in said register and at least equal to another which has already been represented by coded signals in said register; a second channel on said memory; and means for recording the total of the counter counts, obtained by comparing each of said particular ones of said numbers, as coded signals on said second channel so as to have a predetermined space relation with the number in the first channel which was used as the standard of comparison.

8. In a digital computer having a cyclical magnetic drum memory, a sorting system for generating indicia of the relative magnitude of words stored therein, comprising: a storage channel on the memory in which said words are stored; an identifying channel on said memory for storing signals identifying the location of the words on said storage channel; a third channel on said memory; a one-word register synchronized to advance with said storage channel; means responsive to the signals of said identifying channel to set up said one-word register to correspond to each word of said storage channel in sequence; a comparator to compare the word in said one-word register with all other words of said storage channel and having an output whenever the word in said one-word register exceeds another word in magnitude and also when the word of said one-word register is equal in magnitude to another word prior to it in the sequence; a counter responsive to the output of said comparator and having an output; and means for recording the output of said counter into said third channel of said memory when the word of said one-word register has been compared with all words of said storage channel.

9. In a digital computer having a cyclical memory, a system for cyclically sorting groups of words stored therein with respect to datum contained in one of the words of the group each datum having an assigned value, comprising: a storage channel on said memory in which said words are stored in groups; identifying means for identifying one of the words in each group as a sort control word; a second channel on said memory; a one-word recirculating register synchronized to advance with successive words in said storage channel; means responsive to said identifying means to set up and change said one-word recirculating register to successively correspond to the sort control words of the groups in said storage channel once each cycle; comparing means recurrently operable to compare the word presently in said one-word register with the sort control words in each of the groups of said storage channel in successive order and produce an output signal in response to each comparison in which the word in the register is equal to or greater in an assigned value than the word in the storage channel with which it is being compared; means including a counter responsive to the output signals of said comparator to produce an ultimate count when the sort control word in said one-word register has been compared with the sort control word in all the remaining groups of words of said storage channel; and means for recording said ultimate count into said second channel opposite the first word of the group from which the sort control word was taken and recording counts in increasing order into the succeeding words of said second channel for the remainder of the words of said group.

10. In a digital computer having a cyclical memory, a system for cyclically sorting groups of words stored therein with respect to datum contained in one of the words of the group each datum having an assigned value, comprising: a source of timing signals on said memory; a storage channel on said memory in which said words are stored in groups; identifying means for identifying one of the words in each group as a sort control word; a second channel on said memory; a one-word recirculating register synchronized to advance with successive words in said storage channel; means responsive to said identifying means to set up and change said one-word recirculating register to successively correspond to the sort control words of the groups in said storage channel once each cycle; comparing means recurrently operable to compare the sort control word in said one-word recircualting register with the sort control words in each of the groups of said storage channel in successive order and produce an output signal in response to each comparison in which the word in the register is equal to or greater in an assigned value than the word in the storage channel with which it is being compared; a word counter responsive to timing signals from said source and having a capacity equal to the number of word registers on said channel for counting the word periods said comparing means is operable; a counter responsive to the output signals of said comparing means to produce an ultimate count when the sort control word in said one-word register has been compared with the sort control word in all the remaining groups of words of said storage channel as indicated by said word counter; means for increasing the ultimate count of said counter; means for recording said ultimate count into said second channel opposite the first word of the group from which the standard sort control word was taken, and for recording counts in increasing order into the succeeding words of said second channel for the remainder of the words of said group; means for rendering said word counter ineffective during the operation of said recording means; and means following the operation of said recording means for setting up said one-word register to correspond to the sort control word sensed from the next group on the storage channel.

11. A system for sorting in accordance with magnitude of words stored in the cyclic memory of a digital computer, comprising: a first channel on the memory having storage registers for storing the words; a second channel on the memory having storage registers corresponding to the registers of said first channel; a recirculating register cooperating with the cyclic memory and synchronized to advance with said channels; means operative to set up in said recirculating register coded signals corresponding to one of the words stored on said first channel; a comparator to compare the words of said first channel with the word in said recirculating register and having an output when the word of said recirculating register and a word of said first channel bear a predefined magnitude relationship; a counter responsive to the output of said comparator to obtain an ultimate count resulting from comparing the word in said recirculating register with all the words of said first channel; and recording means to record a word representing the ultimate count of said counter into the storage register of said second channel corresponding to the storage register of said first channel storing the word with which the coded signals of said recirculating register correspond.

12. In a digital computer having a cyclical memory, a system for cyclically sorting groups of words stored therein with respect to datum contained in one of the words of the group each datum having an assigned value, comprising: a storage channel on said memory in which said words are stored in groups, one of the words in each group being assigned a sort control function and named a sort control word; a second channel on said memory; a one-word recirculating register synchronized to advance with each of successive words of said storage channel in turn; means to set up and change said one-word recirculating register to successively correspond to respective ones of the sort control words of the groups in said storage channel once each cycle; comparing means recurrently operable to compare the sort control word in said one-word recirculating register with the sort control words in each of the groups of said storage channel in successive order and produce an output signal in response to each comparison in which the word in the register is equal to or greater in an assigned value than the word in the storage channel with which it is being compared; a counter responsive to the output of said comparing means in which counter the count is increased by the number of words in a group for each comparison showing that the assigned value of the word presently in said one-word register is numerically greater than that of another sort control word which has not yet been set up in said one-word recirculating register and at least equal to that of another sort control word which has previously been set up in said one-word register; recording means for recording the ultimate count of said counter into said second channel opposite the first word of the group from which the standard datum was taken; and means included in said counter for providing counts in increasing order for recording by said recording means into the succeeding positions of said second channel opposite the remainder of the words of said group.

13. In a digital computer, a multi-channel cyclical memory; a storage channel on said memory in successive arcs of which respective items of numerical information are stored as coded signals; a first identification channel on said memory for storing coded signals identifying the respective locations of the individual arcs of said storage channel in numerical sequence; and means for establishing coded signals in a second identification channel on said memory to provide second identifications of the locations of the respective arcs of said storage channel which identifications are numerically valued in accordance with the relative magnitude of the information stored in the identified items.

14. In a digital computer, a multi-channel cyclical memory; a storage channel on said memory in successive arcs of which respective items of numerical information are stored as coded signals; a first identification channel on said memory for storing coded signals identifying the respective locations of the individual arcs of said storage channel in numerical sequence; sorting means for determining the relative magnitude of the items of numerical information with respect to each other; and means including means responsive to said sorting means for establishing in a second identification channel of said memory second identifications of the respective items of information, the second identifications being each similarly positioned with respect to its corresponding information item and being of numerical magnitude in accord with a numerical value of the respective item of information.

15. A system for assigning indicia of relative magnitude to coded numbers being stored in the cyclical memory of a digital computer comprising: a channel on said cyclical memory in which coded signals representing said numbers are stored; a recirculating register synchronized to advance with said cyclical memory; means for successively setting up said recirculating register with coded signals corresponding to only those numbers in said channel corresponding to a predetermined sequence; comparing means for comparing the coded signals of the number presently set up in said recirculating register with the coded signals of each of the numbers in said channel corresponding to said predetermined sequence; a counter responsive to said comparing means for increasing its count by an amount dependent upon said predetermined sequence each time said comparing means indicates the number presently in said recirculating register is greater than the numbers in said channel which have not yet been set up in said recirculating register, and is greater than or equal to the numbers in said channel which have already been set up in said recirculating register.

16. A serial sorting system for storing positional data in accordance with the relative magnitude of a group of sequentially presented coded signals from a source, comprising: means to set up each coded signal from said source as a standard to be taken in turn; comparing means to compare the standard coded signal once with each of the other coded signals from said source in order, said comparing means providing an output each time the standard coded signal is larger than another coded signal from said source that has not yet served as a standard and at least equal to another coded signal from said source that has already served as a standard; a counter to count the output of said comparing means; and means to store the ultimate count of said counter for presentation in synchronism with its respective coded signal from said source.

17. A digital computer data classifying system for classifying selected items of data from a plurality of data entries stored in a cyclical memory of the digital computer, said computer comprising a cyclical memory and including a recirculating register synchronized to advance with the cyclical memory; means including logical circuitry connected to the memory and the register for setting up in the recirculating register coded signals derived from the memory and representing one of the selected items of an entry stored in the cyclical memory, said signals to serve as a datum; a comparator for comparing the datum in the register with each of the selected items of data stored in the entries in the cyclical memory and for producing output signals indicative of the comparison therebetween; a counting device adapted to produce counts in response to the output signals from the comparator and to produce an ultimate count representative of the relative magnitude of the datum with respect to the selected items of data stored in the cyclical memory; and further logical circuitry connected to said counting device and controlled in accordance with signals indicative of the ultimate count set up in the counting device, for producing output signals representing the relative magnitude of the datum with respect to the selected items of data; and means for transferring the signals representing such relative magnitude representation to a storage location of the cyclical memory.

18. A digital computer data classifying system for classifying selected items of data from a plurality of data entries in the form of computer words stored in the form of coded signals in a cyclical memory of the digital computer, comprising: a cyclical memory, and a first recirculating register synchronized to advance with the cyclical memory; means including logical circuitry connected to said register and said memory, for successively setting up in the first recirculating register signals each representing a selected item of data from one of the entries stored in the cyclical memory; a second recirculating register connected to the logical circuitry to be set up with coded signals in only those periods corresponding to the periods of an entry containing selected data; an arithmetic unit containing a logical network for comparing the signals set up in the first recirculating register with the coded signals in the cyclical memory and passing through the arithmetic unit, for only those periods of an entry defined by the coded signals set up in the second recirculating register; a third recirculating register connected to the logical circuitry and including means by which said third recirculating register is set up with coded signals indicative of the length in words of a complete data entry in the cyclical memory; a counting device connected to the memory and the first recirculating register which increases its content in multiples of units corresponding to the data entry length each time the data in the first recirculating register is relatively greater in magnitude than that of an entry containing a selected item of data in the cyclical memory; further logical circuitry included in the arithmetic unit and connected to said counting device for producing output signals therefrom indicative of the relative magnitude of the coded signals; and means for recording the signal outputs from the further logical circuitry in a storage location of the cyclical memory.

References Cited in the file of this patent

UNITED STATES PATENTS

| | | |
|---|---|---|
| 2,674,733 | Robbins | Apr. 6, 1954 |
| 2,735,082 | Goldberg et al. | Feb. 14, 1956 |
| 2,784,049 | Mitchell | Mar. 5, 1957 |
| 2,798,216 | Goldberg | July 2, 1957 |

FOREIGN PATENTS

| | | |
|---|---|---|
| 167,102 | Australia | Feb. 11, 1954 |

UNITED STATES PATENT OFFICE

CERTIFICATE OF CORRECTION

Patent No. 2,994,066 July 25, 1961

Myron J. Mendelson et al.

It is hereby certified that error appears in the above numbered patent requiring correction and that the said Letters Patent should read as corrected below.

Column 1, line 49, for "succesive" read -- successive --; same column 1, line 62, and column 2, line 49, for "memeory", each occurrence, read -- memory --; column 4, line 25, for "elementary" read -- elemental --; column 5, line 17, strike out "pair"; column 6, line 29, before "a" strike out "in"; column 8, line 5, for "aritmetic" read -- arithmetic --; column 12, line 1, for "in" read -- to --; column 17, line 48, for "$O_4$" read -- $O_6$ --.

Signed and sealed this 5th day of December 1961.

(SEAL)

Attest:

ERNEST W. SWIDER

Attesting Officer

DAVID L. LADD

Commissioner of Patents

USCOMM-DC